US011853793B2

(12) United States Patent
Chen et al.

(10) Patent No.: US 11,853,793 B2
(45) Date of Patent: Dec. 26, 2023

(54) METHODS AND SYSTEM FOR ON-DEVICE AI MODEL PARAMETER RUN-TIME PROTECTION

(71) Applicant: Samsung Electronics Co., Ltd., Suwon-si (KR)

(72) Inventors: Xun Chen, Fremont, CA (US); Jianwei Qian, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 17/067,532

(22) Filed: Oct. 9, 2020

(65) Prior Publication Data

US 2022/0114014 A1 Apr. 14, 2022

(51) Int. Cl.
| | |
|---|---|
| *G06F 9/48* | (2006.01) |
| *G06F 21/53* | (2013.01) |
| *G06F 21/60* | (2013.01) |
| *G06N 20/00* | (2019.01) |
| *G06N 5/04* | (2023.01) |
| *G06N 7/00* | (2023.01) |
| *G06F 9/50* | (2006.01) |

(Continued)

(52) U.S. Cl.
CPC ........ *G06F 9/4881* (2013.01); *G06F 9/30036* (2013.01); *G06F 9/505* (2013.01); *G06F 18/214* (2023.01); *G06F 21/53* (2013.01); *G06F 21/60* (2013.01); *G06N 5/04* (2013.01); *G06N 7/00* (2013.01); *G06N 20/00* (2019.01)

(58) Field of Classification Search
None
See application file for complete search history.

(56) References Cited

U.S. PATENT DOCUMENTS

| 7,543,158 B2 | 6/2009 | Goss |
| 8,375,221 B1 | 2/2013 | Thom et al. |

(Continued)

FOREIGN PATENT DOCUMENTS

| WO | 2017/171987 A1 | 10/2017 |
| WO | 2019/073000 A1 | 4/2019 |
| WO | 2020/142110 A1 | 7/2020 |

OTHER PUBLICATIONS

Tramèr et al., "Slalom: Fast, Verifiable and Private Execution of Neural Networks in Trusted Hardware", Feb. 27, 2019, ICLR. (Year: 2019).*

(Continued)

*Primary Examiner* — Qing Yuan Wu

(57) ABSTRACT

An electronic device includes at least one transceiver, at least one memory, and at least one processor coupled to the at least one transceiver and the at least one memory. The at least one processor is configured to receive, via the at least one transceiver, an AI model in a trusted execution environment (TEE). The at least one processor is also configured to receive an inference request and input data from a source outside the TEE. The at least one processor is further configured to partition a calculation of an inference result between an internal calculation performed by processor resources within the TEE and an external calculation performed by processor resources outside the TEE. In addition, the at least one processor is configured to produce the inference result based on results of the internal calculation and the external calculation.

20 Claims, 23 Drawing Sheets

(51) Int. Cl.
   *G06F 9/30*      (2018.01)
   *G06F 18/214*    (2023.01)

(56) References Cited

U.S. PATENT DOCUMENTS

| | | |
|---|---|---|
| 10,110,566 B2 | 10/2018 | Sidana et al. |
| 2019/0130120 A1 | 5/2019 | Lal et al. |
| 2019/0188386 A1 | 6/2019 | Pogorelik et al. |
| 2019/0220601 A1 | 7/2019 | Sood et al. |
| 2020/0167488 A1 | 5/2020 | Yitbarek et al. |
| 2020/0184043 A1 | 6/2020 | Li et al. |

OTHER PUBLICATIONS

Li et al., "Secure and Private Collaborative Linear Programming", 2006, IEEE. (Year: 2006).*
International Search Report and Written Opinion of the International Searching Authority dated Jul. 7, 2021 in connection with International Patent Application No. PCT/KR2021/002838, 8 pages.
Chetlur et al., "cuDNN: Efficient Primitives for Deep Learning," NVIDIA, Dec. 2014, 9 pages.

* cited by examiner

METHODS AND SYSTEM FOR ON-DEVICE AI MODEL PARAMETER RUN-TIME PROTECTION

TECHNICAL FIELD

This disclosure relates generally to machine learning systems. More specifically, this disclosure relates to methods and systems for on-device artificial intelligence (AI) model parameter run-time protection.

BACKGROUND

It is increasingly common for service providers to run artificial intelligence (AI) models locally on user devices to avoid user data collection and communication costs. However, AI models are valuable assets, and directly releasing AI models exposes the AI models to the risk of copying and unauthorized use. Also, the model parameters contain hidden information about the training data used to train the AI models, so releasing the model parameters can create privacy risks.

SUMMARY

This disclosure provides methods and systems for on-device artificial intelligence (AI) model parameter run-time protection.

In a first embodiment, an electronic device includes at least one transceiver, at least one memory, and at least one processor coupled to the at least one transceiver and the at least one memory. The at least one processor is configured to receive, via the at least one transceiver, an AI model in a trusted execution environment (TEE). The at least one processor is also configured to receive an inference request and input data from a source outside the TEE. The at least one processor is further configured to partition a calculation of an inference result between an internal calculation performed by processor resources within the TEE and an external calculation performed by processor resources outside the TEE. In addition, the at least one processor is configured to produce the inference result based on results of the internal calculation and the external calculation.

In a second embodiment, a method for AI model protection includes receiving an AI model in a TEE. The method also includes receiving an inference request and input data from a source outside the TEE. The method further includes partitioning a calculation of an inference result between an internal calculation performed by processor resources within the TEE and an external calculation performed by processor resources outside the TEE. In addition, the method includes producing the inference result based on results of the internal calculation and the external calculation.

In a third embodiment, a non-transitory computer readable medium embodies a computer program. The computer program includes instructions that when executed cause at least one processor of an electronic device to receive, via at least one transceiver, an AI model in a TEE. The computer program also includes instructions that when executed cause the at least one processor to receive an inference request and input data from a source outside the TEE. The computer program further includes instructions that when executed cause the at least one processor to partition a calculation of an inference result between an internal calculation performed by processor resources within the TEE and an external calculation performed by processor resources outside the TEE. In addition, the computer program includes instructions that when executed cause the at least one processor to produce the inference result based on results of the internal calculation and the external calculation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
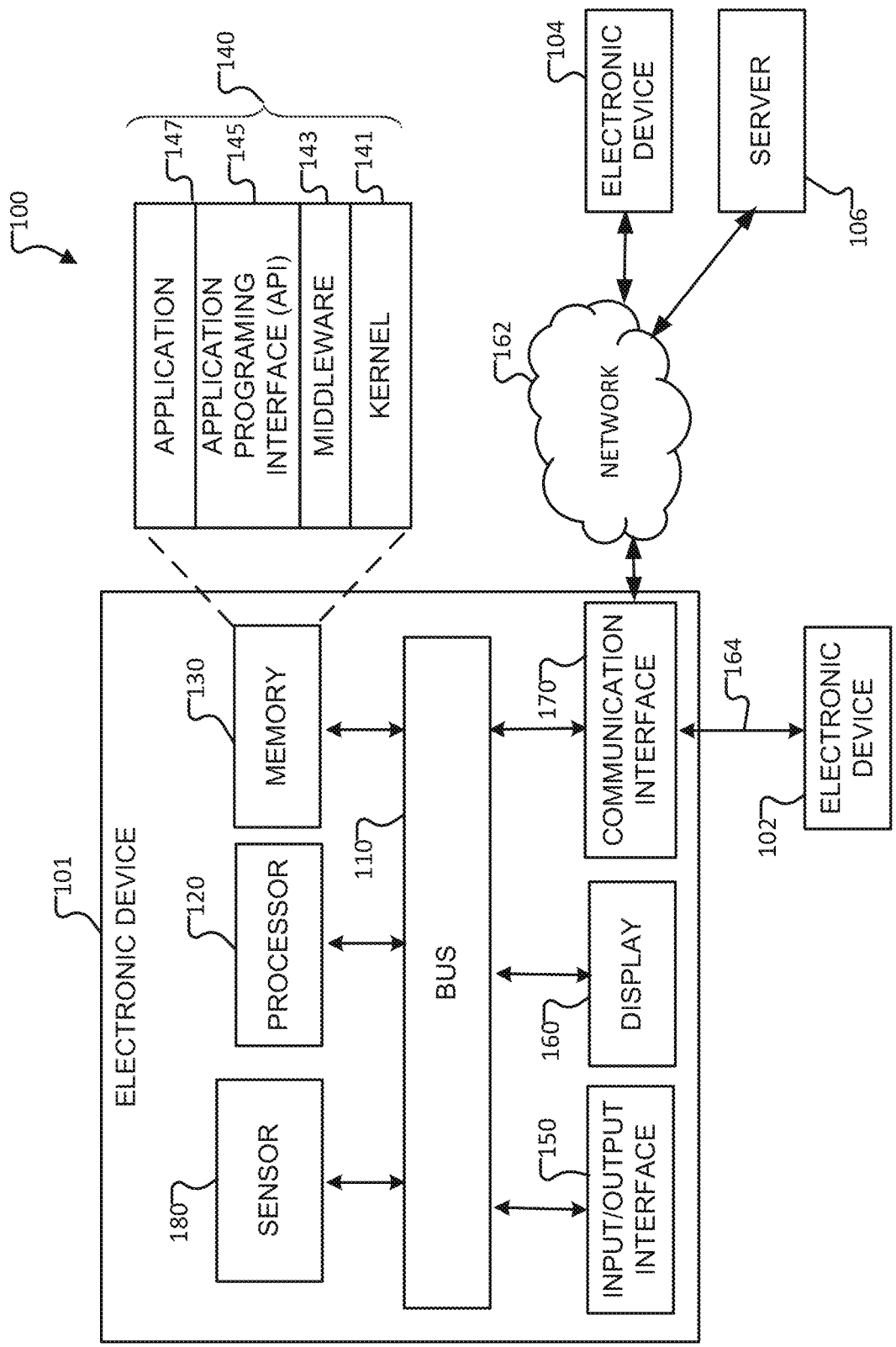
FIG. 1 illustrates an example network configuration in accordance with various embodiments of this disclosure.

FIGS. 1 through 13E, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

Performing on-device artificial intelligence (AI) inferences allows for convenient and efficient AI services to be performed on user devices, such as providing natural language recognition for texting or searching services, image recognition services for images taken using the user devices, or other AI services. To provide on-device AI inferences, a model owner can deploy a model onto a device via an AI service installed on the device. A client, such as an installed application on the device, can request an inference, such as a request to perform image recognition on an image captured by the device, from the AI service. The AI service can provide the model and input data for the inference request to an accelerator for computation. The AI service receives the results of the computation from the accelerator and provides an inference result to the client, and the client can display the inference result to the user. While such on-device AI inferences can provide for convenient and efficient use of user devices for performing AI inferences, when an AI model is running on any end point, such as a computer, mobile device, or Internet of Things (IoT) device, a hacker, such as a malicious user or application, may be able to steal model information, such as model parameters.

This disclosure provides systems and methods for on-device AI model parameter run-time protection. The systems and methods support execution of one or more portions of AI inferences inside a trusted execution environment (TEE) of an electronic device and the obfuscation and protection of certain aspects of the AI model, such as model parameters or intermediary inputs or outputs from layers of the AI model, from detection. A TEE is an environment in a secure area of a processor that protects code and data loaded inside the TEE with respect to confidentiality and integrity. The TEE is isolated and runs in parallel with the operating system in a non-TEE and is more secure than a user-facing operating system. Some TEEs use a hybrid approach that utilizes both hardware and software to protect data, therefore offering a level of security sufficient for many applications. Examples of TEEs include ARM TRUSTZONE and INTEL SGX, although any suitable TEE may be used here. Trusted applications running in a TEE have access to the full power of a device's main processor, peripherals, and memory, while hardware isolation protects these applications from user-installed applications running in the main operating system. Software and cryptographic isolation inside the TEE can also protect the trusted applications contained within from each other.

This disclosure also provides an endpoint or electronic device that includes one or more computation processors supporting TEE and supporting a secure channel between the TEE and the non-TEE on the electronic device. The systems and methods of this disclosure further provide for partitioning the computation workload for inferences between processing resources in the TEE and processing resources outside the TEE to increase or maximize efficiency of processing AI inference requests while protecting aspects of the AI model.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In accordance with various embodiments of this disclosure, the processor 120 can operate both a TEE and a non-TEE, where processor resources of the processor 120 are allocated between the TEE and the non-TEE to perform AI services on the device while obfuscating certain AI model data within the TEE. During performance of such AI services, TEE processor resources and non-TEE processor resources of the processor 120 can be partitioned for performing certain tasks, such as assigning lighter work to the TEE processor resources that will obfuscate certain model data while assigning heavier computation work to the non-TEE processor resources. In some embodiments, separate processors can operate in the TEE and non-TEE.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS). In some embodiments, the memory 130 can be an external memory used by a AI model, which may be stored on the electronic device 101, an electronic device 102, an electronic device 104, or a server 106. The memory 130 can also include a secure storage area used by a TEE that is inaccessible to entities operating in the non-TEE.

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 can include an application running in a non-TEE that receives an inference request, such as an utterance, an image, a data prediction, or other request. The application 147 can also include an AI service running in a non-TEE that processes AI inference requests from other applications on the electronic device 101. The application 147 can further include TEE application processes, such as processes for managing configurations of AI models, performing TEE attestation, receiving, managing, and storing AI models, and/or executing one or more portions of an AI model.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control. In some embodiments, the API 145 includes functions for requesting or receiving AI models from an outside source.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as signals received by the communication interface 170 regarding AI models provided to the electronic device 101.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
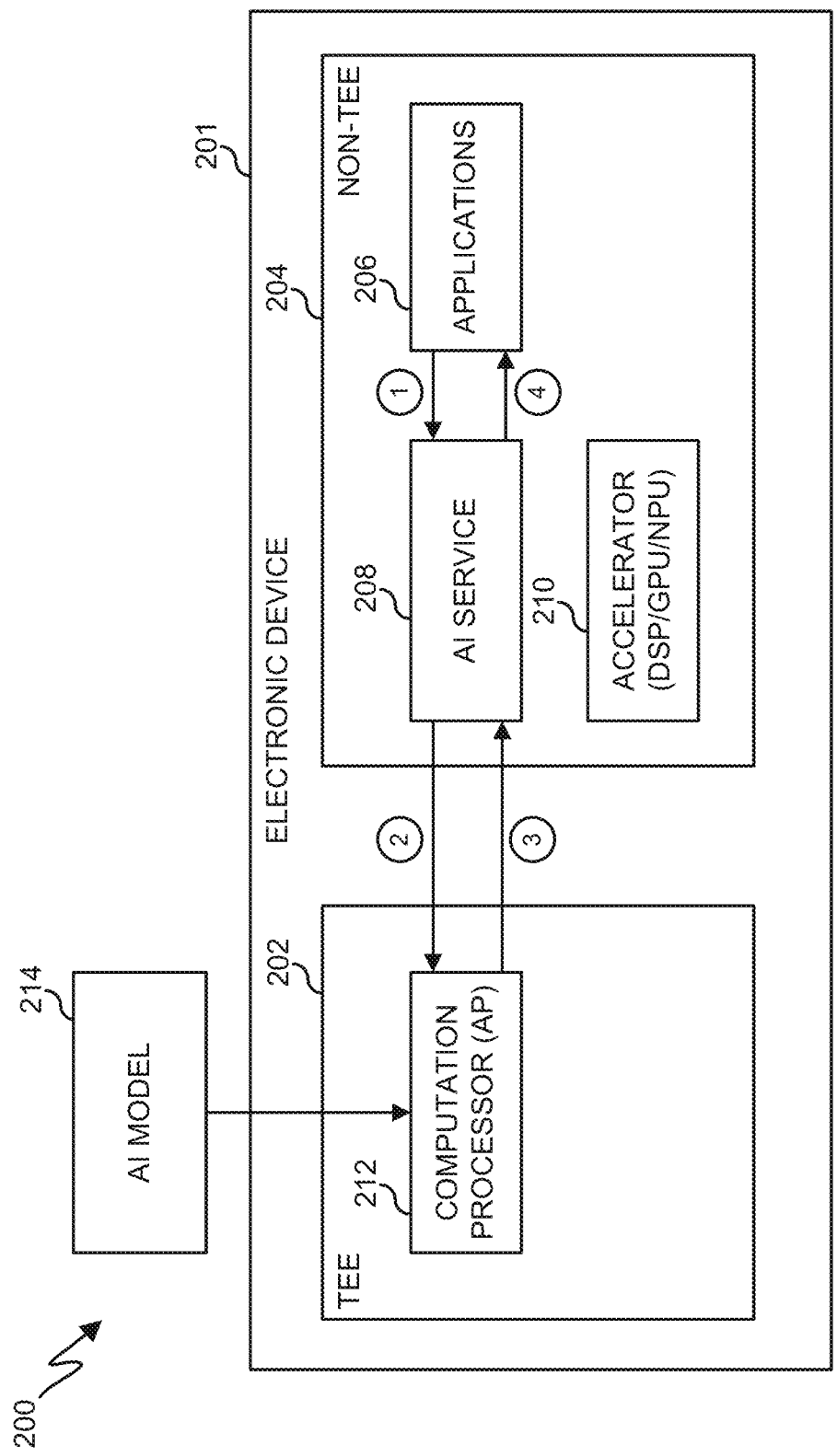
FIG. 2 illustrates an example artificial intelligence (AI) model protection architecture in accordance with various embodiments of this disclosure.

FIG. 2 illustrates an example AI model protection architecture 200 in accordance with various embodiments of this disclosure. As shown in FIG. 2, the architecture 200 includes an electronic device 201, which may represent the electronic device 101 of FIG. 1. The electronic device 201 includes a trusted execution environment (TEE) 202 operating in parallel with a non-TEE 204. The non-TEE 204 includes one or more applications 206, which can include the application 147, and an AI service 208. The AI service 208 receives inference requests from the one or more applications 206. The non-TEE 204 can also include an accelerator 210, such as a digital signal processor (DSP), a graphics processing unit (GPU), or a neural processing unit (NPU), which can also be the processor 120 in some embodiments.

On-device AI inferences can be performed entirely within the non-TEE 204, in which case the AI service 208 receives requests from applications 206 and provides a model and input data to the accelerator 210 for computation. While non-TEE AI inferences can provide for convenient and efficient use of user devices for performing AI inferences, when an AI model is running on any end point, a hacker may be able to steal model information. The architecture 200 provides a solution to this problem.

The architecture 200 also includes a computation processor 212, such as an application processor (AP), which can be the processor 120 in some embodiments. The computation processor 212 performs AI computations for the AI service 208 within the secure TEE 202. An AI model 214 is provided to the computation processor 212 in order to keep the model 214 and its model parameters entirely obfuscated or secret from the non-TEE 204 of the electronic device 201. In some embodiments, the AI model 214 is transmitted to the electronic device 201 via a transceiver, such as the communication interface 170.

One example process flow for an inference request using the architecture 200 includes receiving an AI inference request from an application 206. The AI inference request can include a request to process an input and provide an inference result, such as a request to perform natural language understanding on an utterance provided by a user, a request to perform image recognition on an image captured, received, or accessed by the electronic device 201, a request to provide a prediction, such as a user behavioral prediction, or other AI inference processes. The AI service 208 provides the inference request and input data to the computation processor 212 in the TEE 202. The computation processor 212 performs the complete inference determination using the AI model 214 to process the provided inputs and provide a final inference result, such as slot tagging an utterance, categorizing an image, or other results. The computation processor 212 in the TEE 202 provides the inference result to the AI service 208 in the non-TEE 204, and the AI service 208 returns the inference result to the application 206 so that the application 206 can provide the result to the user or otherwise use the result. The architecture of FIG. 2 thereby provides for secure and protected execution of the AI model 214 since the AI model 214 is only accessed or used within the TEE 202 and no model parameters or computations using the model 214 are allowed outside the TEE 202.

Although FIG. 2 illustrates one example of an AI model protection architecture 200, various changes may be made to FIG. 2. For example, the TEE 202 and the non-TEE 204 could include any number of each component in any suitable arrangement or include other components. For instance, the TEE 202 could also include a secure storage for storing the AI model 214 and/or its parameters. The TEE 202 could also include other components, such as an attestation processor for performing TEE attestation, a configuration manager for managing AI model configurations, a model manager for managing different stored AI models, or a model processor for facilitating execution of a model in conjunction with the computation processor 212. In general, computing architectures come in a wide variety of configurations, and FIG. 2 does not limit the scope of this disclosure to any particular configuration. In addition, while FIG. 2 illustrates one operational environment in which various features disclosed in this patent document can be used, these features could be used in any other suitable system.

Figure 3:
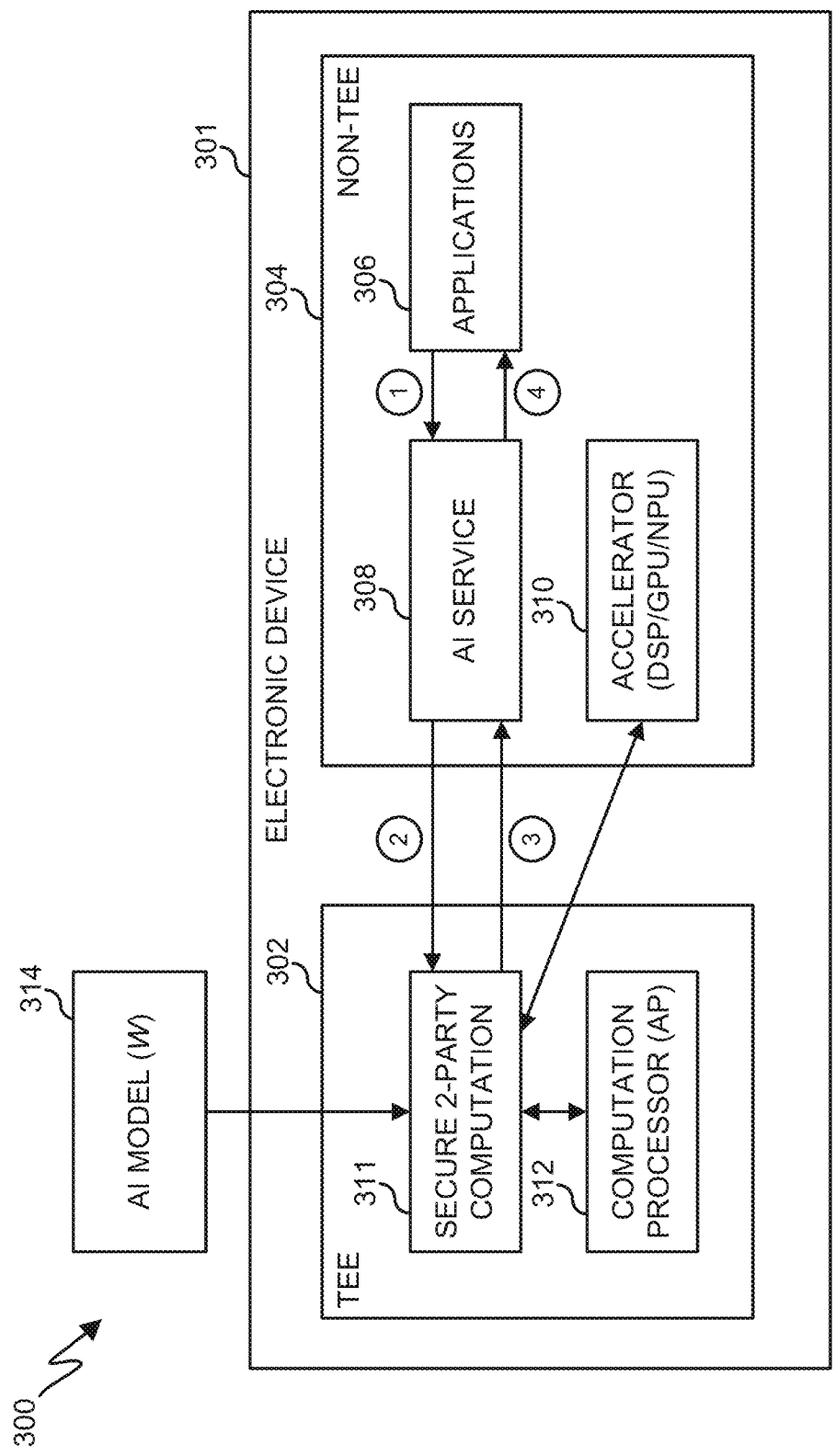
FIG. 3 illustrates an example two-party AI model computation and protection architecture in accordance with various embodiments of this disclosure.

FIG. 3 illustrates an example two-party AI model computation and protection architecture 300 in accordance with various embodiments of this disclosure. As described with respect to FIG. 2, executing an AI model with a TEE while only allowing inputs and outputs to pass between the TEE and the non-TEE provides for a secure architecture in which malicious parties cannot access the AI model or its parameters. In some cases, however, there can be inefficiencies with executing the AI model entirely within the TEE. For example, there may be no computation unit or processor optimized for AI computation, such as parallel computation, within the TEE. The TEE may lack library support to run AI computations efficiently. The TEE may have limited memory, causing issues with accommodating large AI computations. These or other issues with executing an AI model entirely within the TEE can lead to large performance losses. In some cases, AI computations performed in the non-TEE can be ten to forty times faster than in the TEE and provide for greater power efficiency. Thus, in some embodiments, the architecture 200 of FIG. 2 can be used for AI tasks that require less computation, but other architecture schemes can be used for larger computation tasks to increase efficiency while still protecting the AI model and its parameters from malicious parties.

To alleviate the above efficiency issues, the architecture 300 of FIG. 3 allocates AI inference computations between a TEE and a non-TEE to leverage the performance and power efficiency of the non-TEE while providing the security of the TEE for the AI model. Intensive computations, such as matrix multiplications, can be done by the non-TEE without disclosing the original model parameters to the non-TEE. The computations within the TEE can also be minimized to limit computation efficiency losses. In some embodiments, delegating computations between the TEE and the non-TEE can provide up to ten times faster computation speeds or more compared to processing an AI model entirely in the TEE as described with respect to FIG. 2.

As shown in FIG. 3, the architecture 300 includes an electronic device 301, which may represent the electronic device 101 of FIG. 1. The electronic device 301 includes a TEE 302 operating in parallel with a non-TEE 304. The non-TEE 304 includes one or more applications 306, which can include the application 147, and an AI service 308. The AI service 308 receives inference requests from the one or more applications 306. The non-TEE 304 also includes an accelerator 310, such as a DSP, a GPU, or an NPU, which can be the processor 120 in some embodiments. The TEE 302 includes a secure two-party computation processor 311 that allocates computations between the accelerator 310 in the non-TEE 304 and a computation processor 312, such as an application processor operating within the TEE 302, which can be the processor 120 in some embodiments. An AI model 314 is provided to the secure two-party computation processor 311 in order to keep the model 314 and its model parameters obfuscated or secret from the non-TEE 304 of the electronic device 301. In some embodiments, the AI model 314 is transmitted to the electronic device 301 via a transceiver, such as the communication interface 170.

One example process flow for an inference request using the architecture 300 includes receiving an AI inference request from an application 306. The AI inference request can include a request to process an input and provide an inference result, such as a request to perform natural language understanding on an utterance provided by a user, a request to perform image recognition on an image captured, received, or accessed by the electronic device 301, a request to provide a prediction, such as a user behavioral prediction, or other AI inference processes. The AI service 308 provides the inference request and input data to the secure two-party computation processor 311 in the TEE 302. The secure two-party computation processor 311 determines how to partition the computation of the inference result between the computation processor 312 and the accelerator 310. For example, the secure two-party computation processor 311 can partition a calculation of an inference result between an internal calculation performed by processor resources within the TEE 302, such as the computation processor 312, and an external calculation performed by processor resources outside the TEE 302, such as the accelerator 310. In some embodiments, the secure two-party computation processor 311 determines a computation workload for the calculation of the inference result and assigns a computation-heavy portion of the computation workload, such as a matrix multiplication or convolution portion of the calculation, as at least a portion of the external calculation performed by the processor resources in the non-TEE 304.

In some embodiments, to partition the calculation of the inference result, the secure two-party computation processor 311 obfuscates, as at least a portion of the internal calculation performed by the processor resources within the TEE 302, data provided for the computation-heavy portion of the computation workload assigned to the processor resources outside the TEE 302. For example, in some embodiments, data or model parameters can be obfuscated by the computation processor 312 splitting a weight matrix of the AI model into two matrices, which may be done as described below, to obfuscate the original weight matrix. The two matrices are provided to the accelerator 310 in the non-TEE 304, and the accelerator 310 returns computation results calculated using the two matrices to the secure two-party computation processor 311. The computation processor 312 can use the computation results to transform the results into a non-obfuscated result so that the non-TEE 304 is not provided the original weight matrix of the AI model 314. In some embodiments, the computation processor 312 can perturb one or more parameters, such as a weight matrix or intermediary layer inputs, and pass the perturbed parameters to the accelerator 310. Upon receiving computation results from the accelerator 310 using the perturbed parameters, the computation processor 312 transforms the results into unperturbed results. In some embodiments, at least a portion of the internal calculation is performed in the TEE 302 prior to receiving the inference request, such as obfuscating, splitting, or perturbing model parameters and storing the pre-computation results. For example, the TEE 302 can precompute obfuscated model parameters, such as weight matrices, ahead of time so that the obfuscated parameters are available upon receiving an inference request.

The secure two-party computation processor 311 completes the inference determination using the results from the computation processor 312 and the accelerator 310. The secure two-party computation processor 311 in the TEE 302 provides the inference result to the AI service 308 in the non-TEE 304. The AI service 308 returns the inference result to the application 306 so that the application can provide the result to the user or otherwise use the result.

Although FIG. 3 illustrates one example of a two-party AI model computation and protection architecture 300, various changes may be made to FIG. 3. For example, the TEE 302 and the non-TEE 304 could include any number of each component in any suitable arrangement or include other components. For instance, the TEE 302 could also include a secure storage for storing AI model 314 and/or its parameters. The TEE 302 could also include other components, such as an attestation processor for performing TEE attestation, a configuration manager for managing AI model configurations, a model manager for managing different stored AI models, or a model processor for facilitating execution of a model in conjunction with the computation processor 312. In general, computing architectures come in a wide variety of configurations, and FIG. 3 does not limit the scope of this disclosure to any particular configuration.

In addition, while FIG. 3 illustrates one operational environment in which various features disclosed in this patent document can be used, these features could be used in any other suitable system.

Figure 4A:
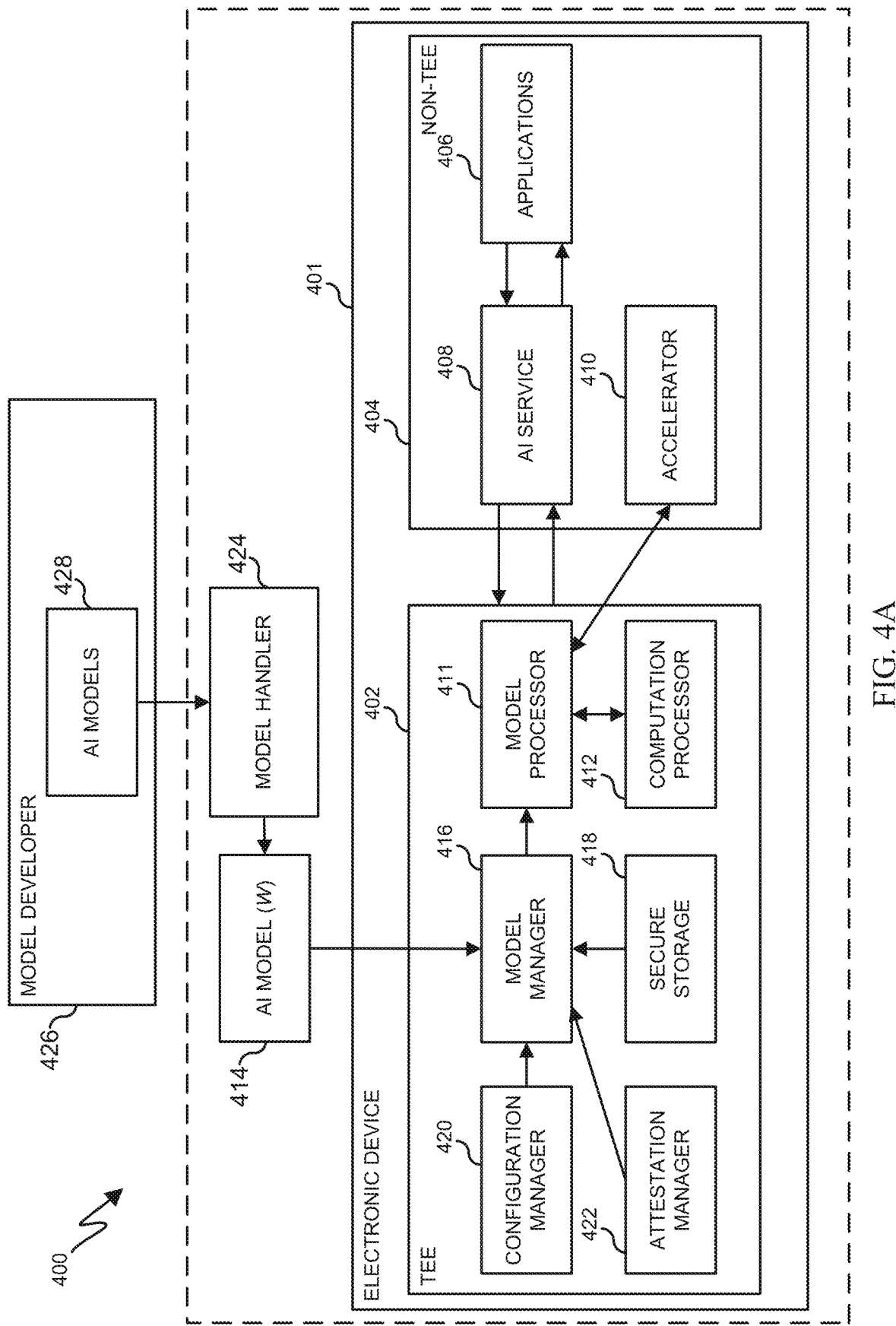
FIGS. 4A and 4B illustrate another example AI model protection architecture in accordance with various embodiments of this disclosure.
Figure 4B:
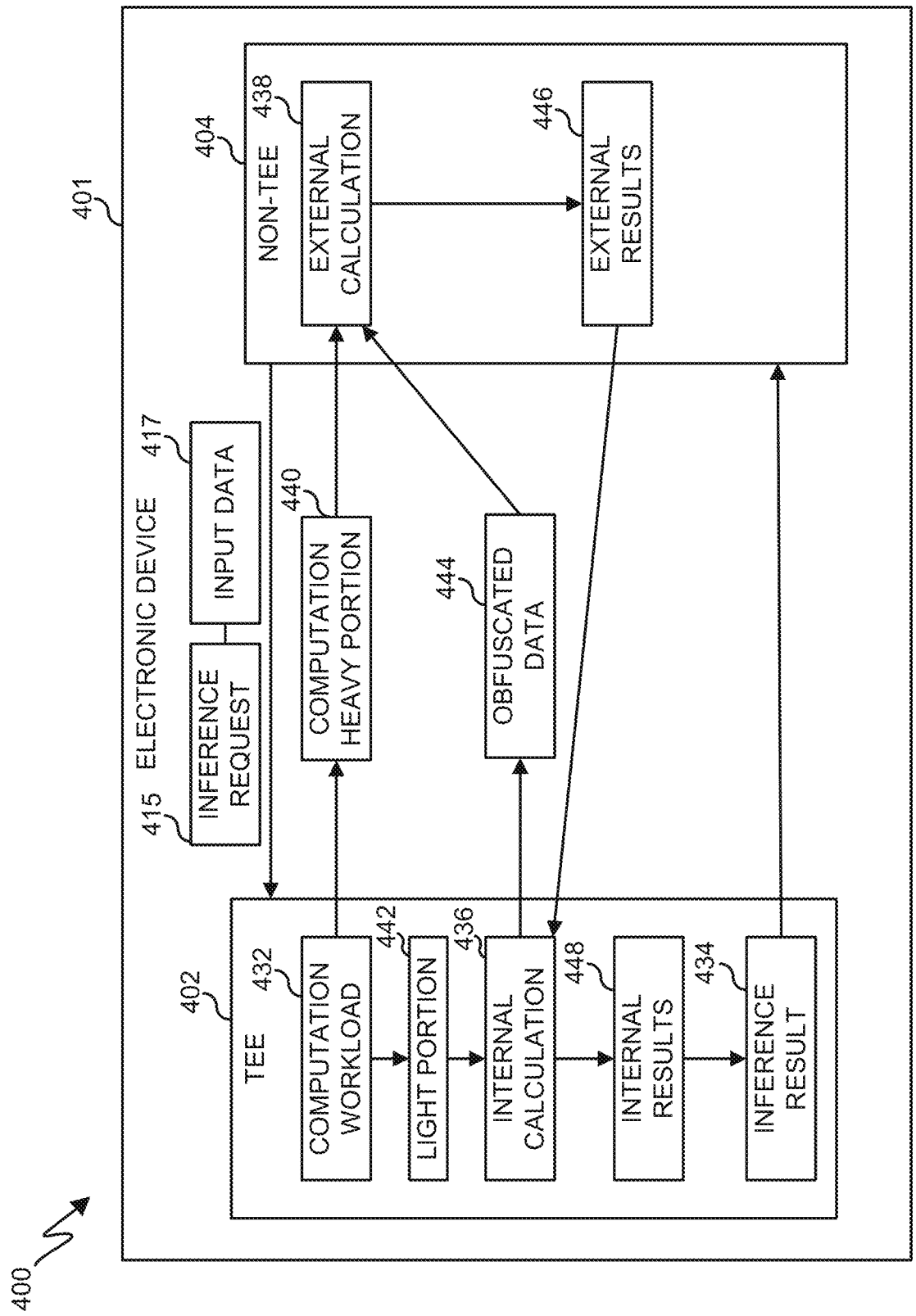

FIGS. 4A and 4B illustrate another example AI model protection architecture 400 in accordance with various embodiments of this disclosure. As described with respect to FIG. 3, partitioning computations for an AI inference between a TEE and a non-TEE leverages the performance and power efficiency of the non-TEE while providing the security of the TEE for the AI model. Intensive computations, such as matrix multiplications, can be done by the non-TEE without disclosing the original model parameters to the non-TEE. The computations within the TEE can also be minimized to limit computation efficiency losses.

As shown in FIGS. 4A and 4B, the architecture 400 includes an electronic device 401, which may represent the electronic device 101 of FIG. 1. The electronic device 401 includes a TEE 402 operating in parallel with a non-TEE 404. The non-TEE 404 includes one or more applications 406, which can include the application 147, and an AI service 408. The AI service 408 receives inference requests from the one or more applications 406. The non-TEE 404 also includes an accelerator 410, such as a DSP, a GPU, or an NPU, which can be the processor 120 in some embodiments. The TEE 402 includes a model processor 411, which in some embodiments can be the secure two-party computation processor 311. The model processor 411 allocates computations between the accelerator 410 in the non-TEE 404 and a computation processor 412, such as an application processor, operating within the TEE 402, which can be the processor 120 in some embodiments.

The TEE 402 also includes a model manager 416, a secure storage 418, a configuration manager 420, and an attestation manager 422. An AI model 414 is provided to the model manager 416 in order to keep the model 414 and its model parameters entirely obfuscated or secret from the non-TEE 404 of the electronic device 401. In some embodiments, the AI model 414 is transmitted to the electronic device 401 via a transceiver, such as the communication interface 170. A model handler 424 in communication with the electronic device 401 can receive, from one or more model developers 426, one or more AI models 428 and can in turn provide AI models to the electronic device 401. In some embodiments, the model manager 416 stores the AI model 414 received by the model manager 416 in the secure storage 418. In some embodiments, the model manager 416 can request the AI model 414 at run-time when an inference request is received by the TEE 402.

One example process flow for an inference request using the architecture 400 includes receiving an AI inference request 415 from an application 406. The AI inference request 415 can include a request to process an input and provide an inference result, such as a request to perform natural language understanding on an utterance provided by a user, a request to perform image recognition on an image captured, received, or accessed by the electronic device 401, a request to provide a prediction, such as a user behavioral prediction, or other AI inference requests. The AI service 408 provides the inference request 415 and input data 417 to the TEE 402. In some embodiments, the model manager 416 retrieves the AI model 414 to be used for the AI inference request 415 from the secure storage 418 or receives the AI model 414 from the model handler 424. In some embodiments, the model manager 416 can also retrieve precomputed obfuscated or perturbed model parameters that were stored in secure storage 418 prior to receiving the AI inference request.

The model manager 416 can also receive one or more notifications from the attestation manager 422 that attestation is successful. Attestation is a mechanism for software to prove its identity, where the goal is to prove to a remote party, such as the model handler 424, that the software and components in the TEE 402 are intact and trustworthy. In some embodiments, the attestation manager 422 can send signed attestation data to a trusted certification authority (CA), such as the model handler 424, for verification that the components in the TEE 402 are trusted and authorized to use the AI model 414. In some embodiments, the attestation data can be encrypted, such as by generating a public and private key pair, generating a hash value, and creating a certification using the encryption keys and hash value. In some embodiments, this data is sent to the CA, which can look up the hash value in a database that maps hash values to trust levels to determine if the TEE 402 applications or components are trustworthy. In some embodiments, attestation protocols can be executed bidirectionally to allow for mutual authentication between the TEE 402 and the CA, which allows the TEE 402 to also verify the identity of the CA, such as to verify the TEE 402 is not reaching a malicious phishing site. Note, however, that the above attestation process is but one example of an attestation process, and other attestation processes can be performed by the attestation manager 422 and/or the TEE 402 without departing from the scope of this disclosure.

The model manager 416 also can retrieve or be provided configuration data for the AI model 414 from the configuration manager 420. Configuration data from the configuration manager 420 can include configurations or options, such as which layer or layers of the AI model 414 to protect with obfuscated data or perturbed data, which processing units (such as an AP, a GPU, a DSP, or a NPU) to use for computations, whether to partition data between the TEE 402 or non-TEE 404, whether to execute all computations within the TEE 402 (such as if the AI inference request 415 is not computation intensive), a number of times to run the AI model 414, or other AI model configuration options.

After performing attestation, retrieving the AI model 414 and any precomputed obfuscated model parameters, and configuring how the AI model 414 is to be executed using the configuration manager 420, the model manager 416 provides the AI model data to the model processor 411. The model processor 411 facilitates the execution of the AI model 414 using the input data 417. The model processor 411 can also partition the computation workload 432 of the inference result between TEE 402 and the non-TEE 404, such as between the computation processor 412 and the accelerator 410. For example, the model processor 411 can partition a calculation of an inference result 434 between an internal calculation 436 performed by processor resources within the TEE 402, such as the computation processor 412, and an external calculation 438 performed by processor resources outside the TEE 402, such as the accelerator 410. In some embodiments, when the model processor 411 partitions the computation workload 432 for the calculation of the inference result 434, the model processor 411 assigns a computation-heavy portion 440 of the computation workload 432, such as a matrix multiplication or convolution portion of the calculation, as at least a portion of the external calculation 438 performed by the processor resources, such as the accelerator 410, in the non-TEE 404. The model processor 411 can also assign a computationally-lighter portion 442 of the computation workload 432, such as data obfuscation and obfuscated parameter recovery, activation, and/or pooling, as at least a portion of the internal calculation 436 performed by the processor resources, such as the computation processor 412, in the non-TEE 404. In some embodiments, the assigning of which portions of the computations to partition between the computation processor 412 and the accelerator 410 can be provided to the model processor 411, such as in part of the configuration data provided by the configuration manager 420.

In some embodiments, to partition the calculation of the inference result, the model processor 411 obfuscates, as at least a portion of the internal calculation performed by the processor resources within the TEE 402, certain data or model parameters via the computation processor 412 and provides obfuscated data 444 for the computation-heavy portion 440 of the computation workload 432 assigned to the processor resources outside the TEE 402. For example, in some embodiments, data or model parameters can be obfuscated by the computation processor 412 splitting a weight matrix of the AI model 414 into two matrices, which may be done as described below, to obfuscate the original weight matrix. The two matrices are provided to the accelerator 410 in the non-TEE 404, and the accelerator 410 returns external results 446 to the model processor 411 in the TEE 402. The computation processor 412 can use the external results 446 to transform or recover the external results 446 into a non-obfuscated result and produce internal results 448. The non-TEE 404 is thus not provided the original weight matrix of the AI model 414. In some embodiments, the computation processor 412 can perturb one or more parameters, such as a weight matrix or intermediary layer inputs, and pass the perturbed parameters to the accelerator 410. Upon receiving external results 446 from the accelerator 410 using the perturbed parameters, the computation processor 412 transforms or recovers the external results 446 into unperturbed results. In some embodiments, at least a portion of the internal calculation is performed in the TEE 402 prior to receiving the inference request, such as obfuscating, splitting, or perturbing model parameters and storing the pre-computation results in the secure storage 418. For example, the TEE 402 can precompute obfuscated model parameters, such as weight matrices, ahead of time so that the obfuscated parameters are available upon receiving an inference request.

The model processor 411 completes the inference determination using the results 446 and 448 from the computation processor 412 and the accelerator 410. For example, multiple layers of the AI model 414 can be performed until a final output is reached as the internal results 448, and the inference result 434 is generated using the final output. The model processor 411 in the TEE 402 provides the inference result to the AI service 408 in the non-TEE 404. The AI service 408 returns the inference result to the application 406 so that the application can provide the result to the user or otherwise use the result.

Although FIGS. 4A and 4B illustrate another example of an AI model protection architecture 400, various changes may be made to FIGS. 4A and 4B. For example, the TEE 402 and the non-TEE 404 could include any number of each component in any suitable arrangement or include other components. As a particular example, the components in FIG. 4A could be combined such that, for instance, the model manager 416 and model processor 411 are the same component that perform the functions of both components as described in this disclosure. As another particular example, the functions as described in this disclosure with respect to the model processor 411 and computation processor 412 could be provided by the same components, such as one of the model processor 411 or the computation processor 412. In general, computing architectures come in a wide variety of configurations, and FIGS. 4A and 4B do not limit the scope of this disclosure to any particular configuration. In addition, while FIGS. 4A and 4B illustrate one operational environment in which various features disclosed in this patent document can be used, these features could be used in any other suitable system.

Figure 5:
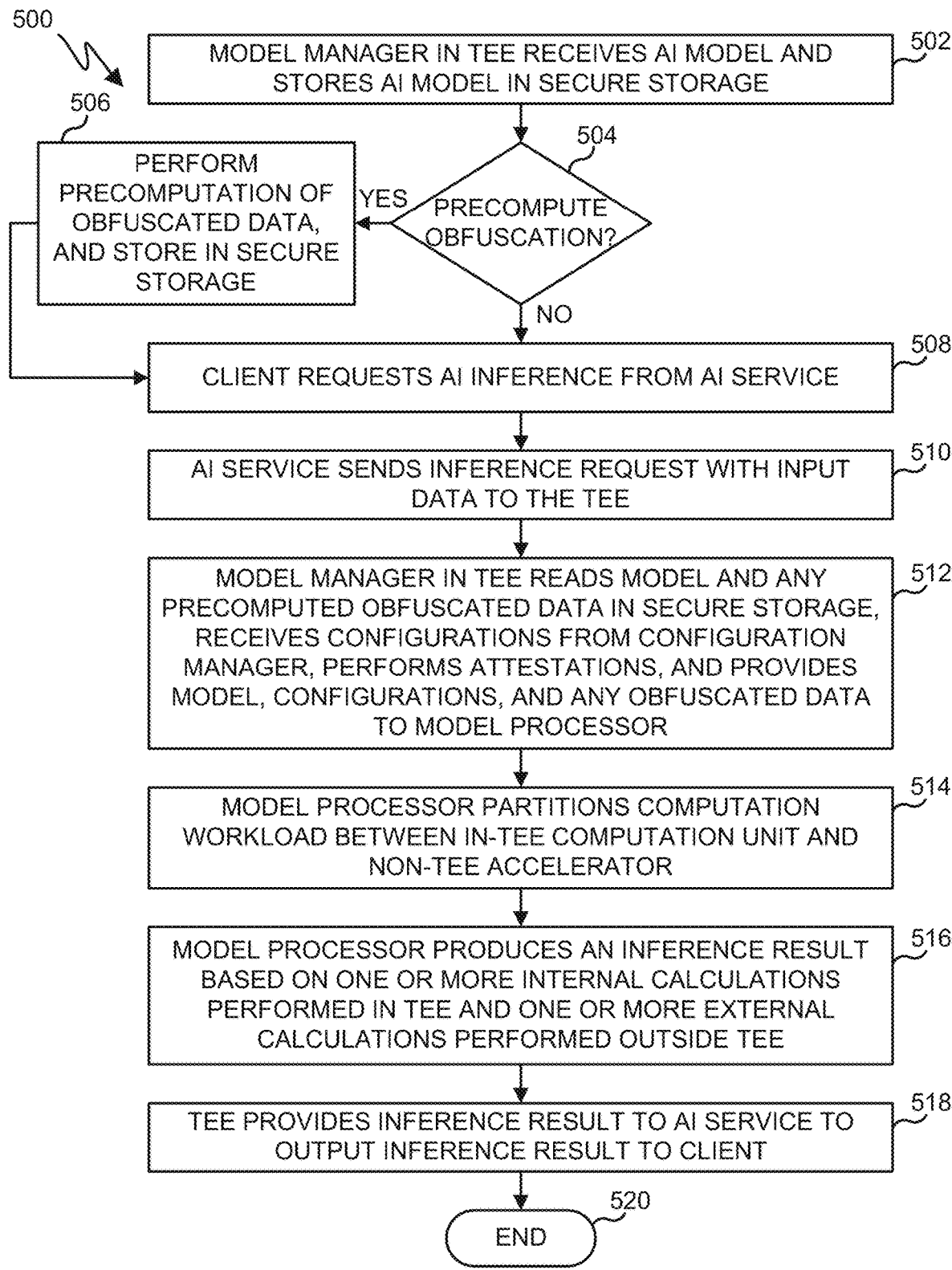
FIG. 5 illustrates an example AI model protection process in accordance with various embodiments of this disclosure.

FIG. 5 illustrates an example AI model protection process 500 in accordance with various embodiments of this disclosure. For ease of explanation, the process 500 may be described as being executed or otherwise used by the processor(s) 120 of any of the electronic devices 101, 102, 104 or the server 106 in FIG. 1. In some embodiments, the process 500 can be used by the architecture 400 described with respect to FIGS. 4A and 4B. However, the process 500 may be used by any suitable device(s) and in any suitable system.

At block 502, the processor, such as via a model manager like the model manager 416 in a TEE, receives an AI model and stores the AI model in secure storage, such as the secure storage 418. At decision block 504, the processor, such as via the model manager 416, determines if obfuscated data should be precomputed prior to run-time (prior to receiving an inference request). In some cases, configuration data for the AI model can indicate that obfuscated data should be precomputed. Obfuscated data can be precomputed and stored in the TEE so that, when an AI inference request is received by components within the TEE from a source outside the TEE, at least some obfuscated data does not have to be computed at run-time, increasing the speed of computing an AI inference result. If the processor determines that the obfuscation is to be precomputed at decision block 504, at block 506, the processor, such as via a model processor like the model processor 411, provides obfuscated data. In some embodiments, a computation processor, such as the computation processor 412, computes the precomputed obfuscated data as described in various embodiments in this disclosure. The precomputed obfuscated data is stored in the secure storage.

At block 508, a client in the non-TEE, such as an application 406, requests an AI inference from an AI service, such as the AI service 408, in the non-TEE. The client also provides input data including one or more inputs, such as utterance data or image data, to the AI service. At block 510, the AI service sends an inference request with the input data to the TEE. At block 512, the processor, such as via the model manager, reads an AI model and any precomputed obfuscated data from secure storage and receives AI model configurations from a configuration manager, such as the configuration manager 420. The processor can also perform, such as via an attestation manager like the attestation manager 422, attestations to verify security of the TEE. The processor, such as via the model manager, can provide the model, model configurations, and any obfuscated data to the model processor. At block 514, the processor, such as via the model processor, partitions the computation workload for determining an inference result based on the AI inference request between an in-TEE computation unit, such as the computation processor 412, and a non-TEE computation unit, such as the accelerator 410. For example, the processor can assign internal calculation tasks such as data obfuscation, like splitting or perturbing weights of the AI model or layer outputs to be provided to a next layer. The processor can also assign tasks such as performing activation functions or pooling to the computation processor in the TEE. The processor can assign heavier workload tasks, such as matrix multiplications or convolutions, as external calculations performed by the non-TEE accelerator. Assigning obfuscation of data to the TEE processing resources allows for original model parameters to remain in the TEE where the original model parameters are obfuscated. The obfuscated parameters are provided to the non-TEE accelerator to perform the heavier-workload tasks. The results of the heavier workload tasks are provided to the TEE, where the results can be transformed or recovered back to non-obfuscated results.

At block 516, the processor, such as via the model processor, produces an inference result based one or more internal calculations as partitioned to the TEE and performed by the TEE and one or more external calculations as partitioned to the non-TEE and performed by the non-TEE. For example, for each layer of the AI model, certain model parameters can be obfuscated by the TEE, which are passed to the non-TEE for calculation tasks, such as matrix multiplications or convolutions, and results are transformed or recovered by the TEE until each layer of the AI model is processed and a final output is reached. It will be understood that there can be multiple iterations or tasks partitioned between the TEE and the non-TEE, and these iterations can be performed in a certain order depending on the model architecture. At block 518, the TEE provides the inference result to the AI service in the non-TEE to output the inference result to the client. The process 500 ends at block 520.

Although FIG. 5 illustrates one example of an AI model protection process, various changes may be made to FIG. 5. For example, while shown as a series of steps, various steps in FIG. 5 can overlap, occur in parallel, occur in a different order, or occur any number of times. As a particular example, in some embodiments, decision block 504 can be avoided if the TEE is pre-configured to not perform precomputation of data. As another particular example, in some embodiments in which all AI inference calculations are performed within the TEE (such as when a particular inference uses less-intensive calculations), block 514 can be avoided such that the processor computes the entire inference within the TEE and outputs the result to the AI services in the non-TEE at block 518.

Figure 6:
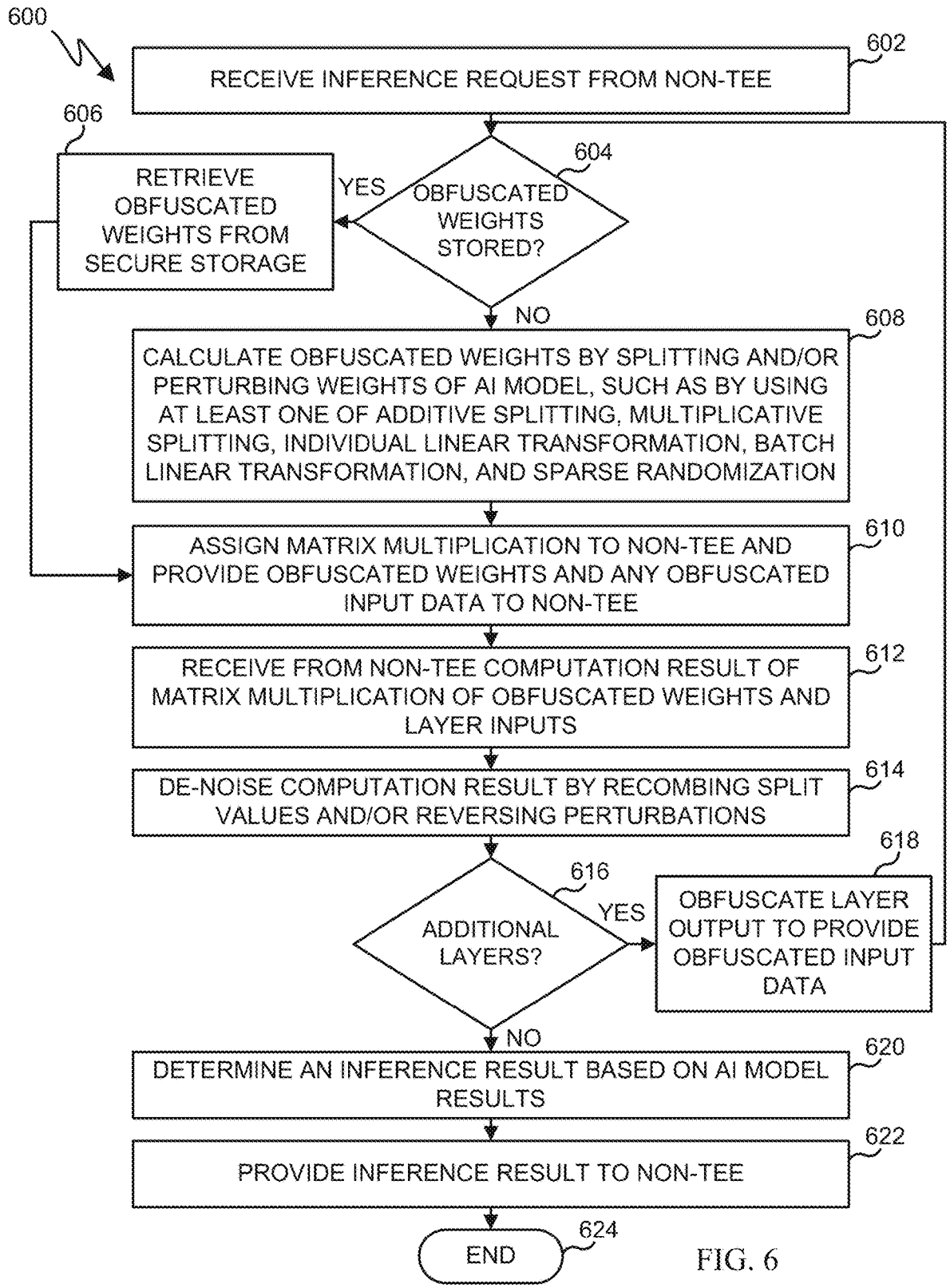
FIG. 6 illustrates an example AI model parameter obfuscation process in accordance with various embodiments of this disclosure.

FIG. 6 illustrates an example AI model parameter obfuscation process 600 in accordance with various embodiments of this disclosure. For ease of explanation, the process 600 may be described as being executed or otherwise used by the processor(s) 120 of any of the electronic devices 101, 102, 104 or the server 106 in FIG. 1. In some embodiments, the process 600 can be used by the architecture 400 described with respect to FIGS. 4A and 4B. However, the process 600 may be used by any suitable device(s) and in any suitable system.

In various embodiments of this disclosure, two-party computations between a TEE and a non-TEE can be divided into three phases of precomputation, delegation, and recovery. The precomputation phase includes the generation of obfuscated model parameters prior to run-time by the TEE. Generation of obfuscated model parameters and of inputs can also occur during run-time depending on the configuration settings for the AI model or because precomputed model parameters previously stored in secure storage are exhausted due to use in AI inference requests. The delegation phase includes the partitioning of tasks during run-time between the TEE and the non-TEE. For example, the TEE can be delegated tasks such as obfuscating model parameters or inputs and other tasks such as applying activation functions, pooling, batch normalization, performing rectified linear unit (ReLU) functions, or other tasks. The non-TEE can be delegated more computation-heavy tasks such as matrix multiplications using obfuscated data provided to the non-TEE by the TEE. The recovery phase includes the TEE receiving the results or outputs from the non-TEE such as the results of matrix multiplications and de-noising the results to recover true non-obfuscated results such as by recombining split data and/or reversing perturbed data based on previous splitting and/or perturbing of data by the TEE. After the recovery phase, the TEE proceeds to the next layer of the AI model or neural network to repeat delegation and recovery until the output layer is reached.

At block 602, the processor, such as via the model processor 411, receives an inference request from the non-TEE, such as the non-TEE 404. At decision block 604, the processor, such as via the model manager 416, determines if precomputed obfuscated weights are stored in a secure storage, such as the secure storage 418. If so, at block 606, the processor retrieves the precomputed obfuscated weights from the secure storage. If not, at block 608, the processor, such as via the computation processor 412, calculates obfuscated weights, such as by splitting and/or perturbing weights of an AI model. Obfuscated data can be computed during a precomputation stage or during run-time at block 608 depending on the configuration of the AI model. For example, the processor within the TEE can obfuscate data by splitting or perturbing a weight matrix W and storing the resulting weights in secure storage at a precomputation phase or at run-time in response to receiving an inference request.

Figure 7:
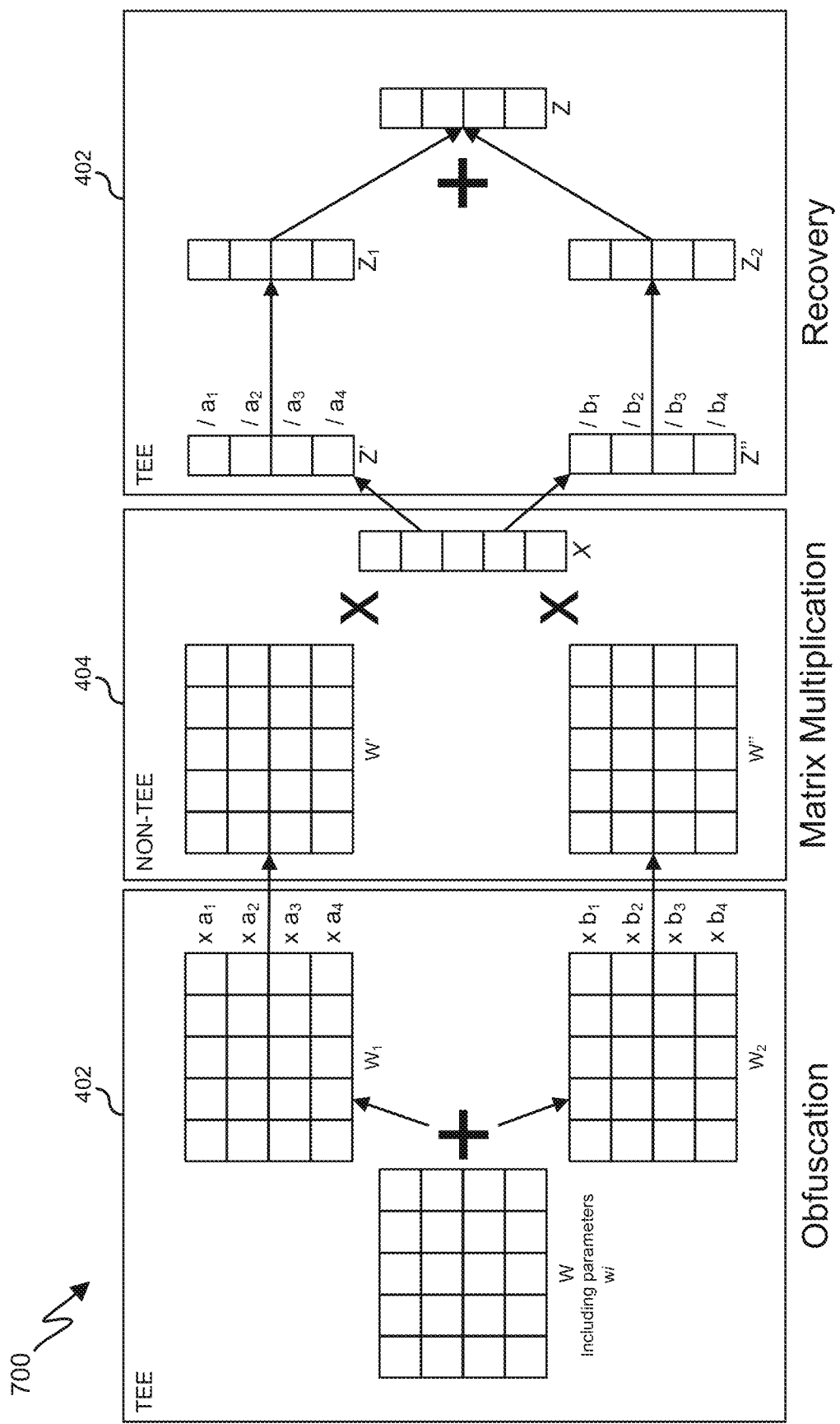
FIG. 7 illustrates an example process for obfuscating model parameters by additive splitting and delegating matrix multiplication in accordance with various embodiments of this disclosure.

Turning to FIG. 7, FIG. 7 illustrates an example process 700 for obfuscating model parameters by additive splitting and delegating matrix multiplication in accordance with various embodiments of this disclosure. For example, to perform additive splitting, the processor within the TEE 402, for each entry w in the weight matrix or vector, randomly splits each entry w into two or more parts whose sum is w. For instance, w can be split into two parts such that $w=w_1+w_2$. In some embodiments, this can be done once and stored in the secure storage to reduce overhead. In this example, to generate $w_1$, the processor randomly chooses a real number as $w_1$ within a predetermined range. One example range is $[-kw, -mp] \cup [mp, kw]$, where p is the floating point number precision and k and m are small positive integers derived based on that, for any i, $|w_i|$ is not too large to cause overflow or too small to be beyond the floating point number precision. The processor can then set $w_2=w-w_1$. As shown in FIG. 7, this example of additive splitting thus creates two matrices $W_1$ and $W_2$ that can both be passed to the non-TEE 404 for heavier computations, such as for use by the accelerator 410. In some embodiments, the accelerator 410 can perform heavier computations such as matrix multiplications by multiplying both $W_1$ and $W_2$ separately with an input vector X to produce $Z_1$ and $Z_2$, where $Z_1$ and $Z_2$ are the results of multiplying the input vector X with $W_1$ and $W_2$, respectively. $Z_1$ and $Z_2$ are passed back to the TEE 402 and recombined into the layer output Z. It will be understood that W can be split into any number of matrices.

In some embodiments such as the one shown in FIG. 7, to further obscure the data, $W_1$ and $W_2$ can be perturbed by multiplying each w of $W_1$ with a random constant ai in a set A to produce a matrix W' and by multiplying each w in $W_2$ with a random constant bi in a set B to produce a matrix W". As shown in FIG. 7, different a values or different b values can be used for different rows of $W_1$ and $W_2$, respectively. Resulting values in any of the operations in this process may also be rounded up or down. In some embodiments, random values ai and bi for $W_1$ can be generated using a pseudo-random number generator. In this example, both matrices W' and W" are passed to the non-TEE 404 to delegate matrix multiplication to the non-TEE 404 where the non-TEE 404 performs matrix multiplication of each of W' and W" with the input vector X such that Z'=XW' and Z"=XW". The non-TEE 404 passes Z' and Z" to the TEE 402 to perform recovery of the real output Z. The non-TEE 404 therefore does not ever see the real model parameters in this example. In some embodiments, X can be the real inputs for the first layer, and X can be obfuscated by the TEE 402 for subsequent layers so that a malicious party with access to the non-TEE 404 cannot reverse the calculations to obtain the real parameters, input, or outputs. To recover the real output Z by the TEE 402, the processor divides each z in Z' by the corresponding a value used previously in the obfuscation process to produce $Z_1$. Similarly, the processor divides each z in Z" by the corresponding b value used previously in the obfuscation process to produce $Z_2$. To fully recover Z, $Z_1$ and $Z_2$ are additively combined to provide Z as shown in FIG. 7.

Turning back to FIG. 6, other example techniques for obfuscating the model parameters or inputs can include multiplicative splitting, individual linear transformation, batch linear transformation, or sparse randomization. It will be understood that the obfuscation techniques described in this disclosure can also be combined to further obscure data by the TEE. Multiplicative splitting in various embodiments of this disclosure may include, for each weight w in a weight matrix or vector, splitting the weight w into two or more parts whose product is w such that $w=w_1 \times w_2$. Like additive splitting, to generate $w_1$, the processor randomly chooses a real number as $w_1$ within a predetermined range. One example range is $[-kw, -mp] \cup [mp, kw]$, where p is the floating point number precision and k and m are small positive integers derived based on that, for any i, $|w_i|$ is not too large to cause overflow or too small to be beyond the floating point number precision. The processor can then set $w_2=w/w_2$. As shown with respect to additive splitting, the entries in $W_1$ and $W_2$ can be further perturbed to produce W' and W" based on the configuration used for processing the AI model. To perform individual linear transformation, for each entry w of the matrix or vector, the processor changes the entry w into aw+b. Similar to choosing the random values for $W_1$ as in additive or multiplicative splitting, a and b can be chosen such that aw+b is not too big or too small. Special cases can also be used, such as setting a=1 or b=0, so that each entry w is changed into w+b or aw, respectively. To perform batch linear transformation, for the whole matrix or vector or for each row or column of the matrix or vector, the processor changes the matrix or vector W into aW+B. Similar to choosing the random values for $W_1$ as in additive or multiplicative splitting, a and B can be chosen such that aW+B is not too big or too small. Special cases can also be used, such as setting a=1 or B=0, so that W is changed into W+B or aW, respectively. To perform sparse randomization, the processor randomly chooses a number of entries w in W and perturbs these chosen entries, such as via splitting or linear transformation. Sparse randomization can be used to provide reduced computation overhead. In some embodiments, each entry in W can be chosen with a probability p. In some embodiments, k entries can be chosen randomly in each row or column of W.

At block 610, the processor delegates matrix multiplication, convolution, or other computation-heavy operations to the non-TEE, such as the accelerator 410, and provides the obfuscated weights and any obfuscated input data to the non-TEE. In some embodiments, the first layer inputs are not obfuscated. At block 612, the processor receives the computation results from the non-TEE. At block 614, the processor de-noises or recovers the results by recombining the split values and/or reversing the perturbations. At decision block 616, the processor within the TEE determines if additional layers are to be processed from the AI model to reach the final output. If so, at block 618, the processor obfuscates the layer output to provide obfuscated input data to be used for the next layer of the AI model. As described in the various embodiments in this disclosure, obfuscating the layer outputs for the next layer input prevents the non-TEE from finding out the model parameters. In some embodiments, the processor within the TEE can also perform other layer functions, such as applying activation functions or performing pooling.

The process 600 moves back to decision block 604 to determine if more obfuscated weights are provided in the secure storage. In some embodiments, a certain number of sets of obfuscated weights can be stored in the secure storage. For example, if seven sets of obfuscated weights are stored in secure storage, the process 600 can loop from block 618 back to decision block 604 and retrieve the stored obfuscated weights in block 606 until all sets have been used. Upon using all seven sets, the processor can produce additional sets at block 608 for every layer until the final output for the AI inference is reached. At block 620, the processor within the TEE determines an inference result based on the final results from the AI model. At block 622, the processor passes the inference result to the non-TEE so that the result can be presented to the user or otherwise used. The process ends at block 624.

Although FIG. 6 illustrates one example of an AI model parameter obfuscation process, various changes may be made to FIG. 6. For example, while shown as a series of steps, various steps in FIG. 6 can overlap, occur in parallel, occur in a different order, or occur any number of times. As a particular example, in some embodiments, decision block 604 may only be performed on a first loop to increase efficiency. If, during the first loop, the processor determines there are no obfuscated weights stored (indicating there are likely no other obfuscated weights currently stored), this check can be skipped on subsequent loops. Decision block 604 can also be avoided if the TEE is preconfigured to not perform precomputation of data.

Figure 8A:
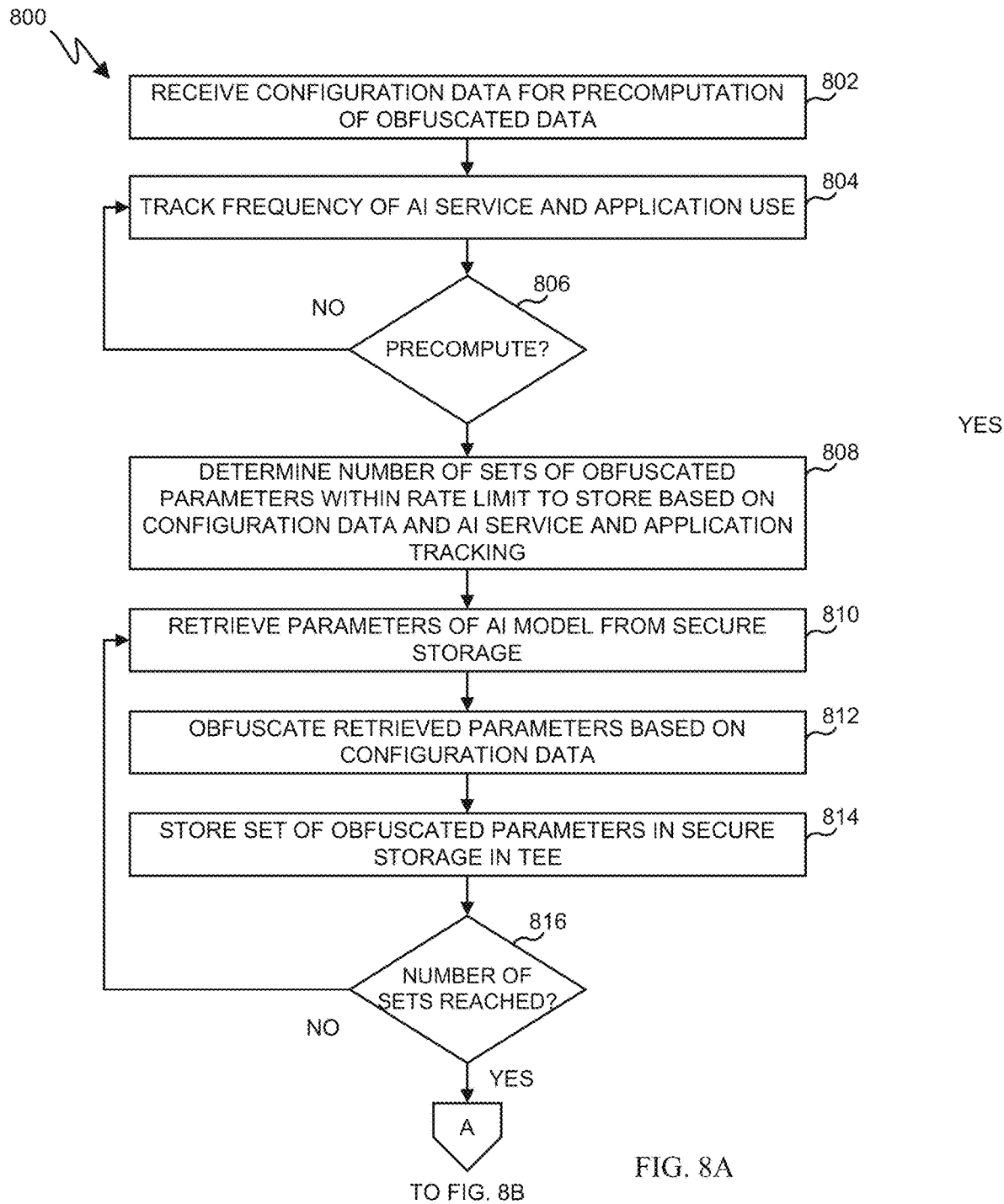
FIGS. 8A and 8B illustrate an example trusted execution environment precomputation process in accordance with various embodiments of this disclosure.
Figure 8B:
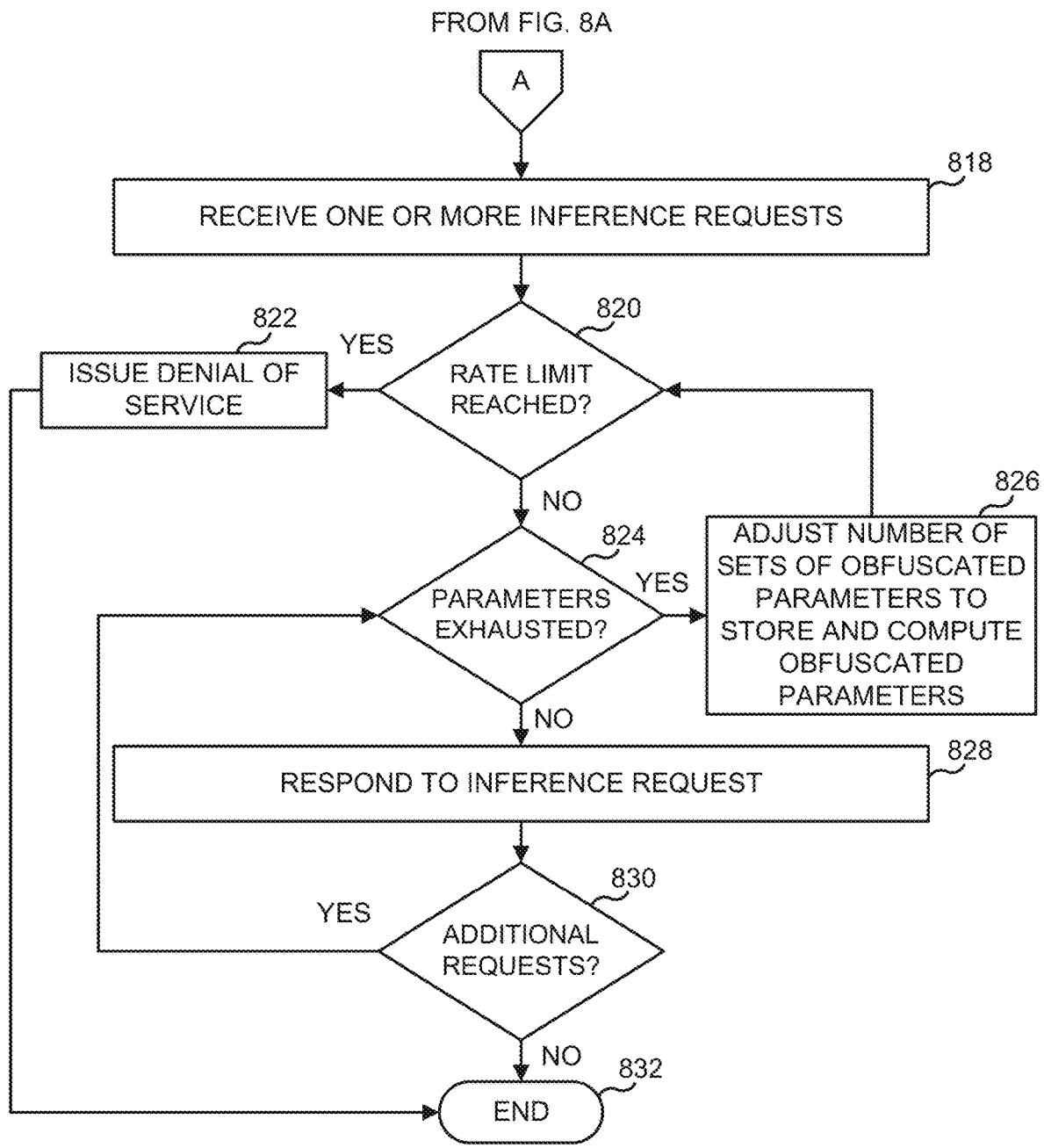

FIGS. 8A and 8B illustrate an example TEE precomputation process 800 in accordance with various embodiments of this disclosure. For ease of explanation, the process 800 may be described as being executed or otherwise used by the processor(s) 120 of any of the electronic devices 101, 102, 104 or the server 106 in FIG. 1. In some embodiments, the process 800 can be used by the architecture 400 described with respect to FIGS. 4A and 4B. However, the process 800 may be used by any suitable device(s) and in any suitable system.

In some embodiments of this disclosure, precomputation of obfuscated data, such as randomized noisy weight matrices or vectors created by splitting and/or perturbing the weights, can be performed while an electronic device is idle. As a result, obfuscated data is stored in secure storage, such as the secure storage 418, and is ready to be used for the next AI inference request. Precomputing the weights can increase efficiency during run-time of processing an AI inference. As shown in FIG. 8A, at block 802, the processor, such as via a configuration manager like the configuration manager 420, receives configuration data including settings for precomputation of obfuscated data. The configuration data can include settings such as an initial setting for how often to perform precomputations, how many precomputations to store in secure storage, and/or when to precompute obfuscated data (like at the time of deployment of a model, when the electronic device is idle, when the electronic device is charging, at a certain time of day, and/or other times). In some embodiments, the initial settings may provide for no precomputations until the processor determines the frequency of AI inferences performed using the device.

At block 804, the processor tracks the frequency of use of an AI service, such as the AI service 408, and/or applications, such as application 406, that request AI inferences. For example, the processor can log the number of times an AI inference is requested over a period of time, such as one week. The AI inferences can also be classified or categorized based on the particular AI model used. At decision block 806, the processor determines if the appropriate time to precompute obfuscated model parameters is reached, such as whether the device is idle or other times as described above. If not, the process 800 returns to block 804.

Otherwise, at block 808, the processor determines a number of sets of obfuscated weights to store based on the configuration data and the tracking of AI service and application use. In some embodiments, if an AI inference for image detection using a first model is requested three times a week, the processor can, at the appropriate time, determine that three sets of obfuscated model parameters are to be created for use with the image detection AI model. This provides enough obfuscated model parameters to perform three image detection inference requests, providing for an estimated amount of AI inference requests for a week. In this example, the configuration settings can provide that the precomputations are only performed once a week to replenish a secure storage exhausted of obfuscated model parameters. In embodiments where precomputations are performed more frequently, such as if the settings provide that sets can be created every time the device is idle or charging, two more sets can be precomputed if the processor determines that three sets are to be maintained in the secure storage but only one set remains. As another example, if the user more frequently requests utterance inferences, such as twenty times a day, the processor can determine to create thirty obfuscated sets to account for variations in daily usage or 210 sets to account for estimated weekly usage (if allowed by the size of the secure storage).

It will be understood that the period of time to create sets can be any amount of time, such as every hour, day, week, or month. It will also be understood that the number of sets to create may not be commensurate with the total times over the period of time that the processor estimates an AI model will be used. For example, the processor may determine that the user uses an utterance detection AI model fifty times a week, but the processor may only generate twenty-five sets. In some embodiments, exact parameters for controlling the timing and the number of sets to create for precomputation can be configured by the model developer. It will further be understood that, if precomputed parameters are exhausted, such as if a user happens to request more AI inferences than normal during a period of time, additional obfuscated parameters can be computed at runtime.

In some embodiments, a rate limit can be used that limits the number of sets of obfuscated weights that can be precomputed. The precomputation of perturbed weights can utilize the randomness typically generated from the device hardware or software. The processor can be configured to ensure the randomness is not exhausted at the time of precomputation. This typically happens when a large amount of perturbed weights is to be computed in a very short time. After the randomness is exhausted, it can be difficult to generate perturbed weights. To avoid such a situation, a rate limit policy can be enforced by the TEE. In addition to the frequency of use and other criteria for determining the number of sets of obfuscated parameters to create, the precomputation of obfuscated parameters can be performed at a suitable rate depending on the specifics of devices such as hardware and software configuration and system load at the time of precomputation. The rate limit can be a threshold number of parameters that acts as a limit or ceiling to the number of obfuscated parameters sets to generate.

At block 810, the processor, such as via the model manager, retrieves model parameters, such as weights, for the AI model from the secure storage. At block 812, the processor obfuscates the retrieved model parameters by altering parameter values based on the configuration data. For example, the configuration data can provide that obfuscated parameters be created by one or more of additive splitting, multiplicative splitting, individual linear transformation, batch linear transformation, and sparse randomization. At block 814, the precomputed obfuscated weights are stored in secure storage in the TEE. At decision block 816, the processor determines if the specified number of sets of obfuscated parameters determined in block 808 have been created and stored. If not, the process 800 returns to block 810 to retrieve additional parameters from the AI model. Otherwise, the process 800 moves to block 818, as illustrated in FIG. 8B.

At block 818, the processor receives one or more runtime inference requests. At decision block 820, the processor determines if the number of the one or more inference requests exceeds the rate limit established by the rate limit policy. In some embodiments, in addition to ensuring the randomness is not exhausted during precomputation, the processor can also be configured to ensure the randomness is not exhausted at runtime computation, such as when an inference request is received when the precomputed parameters, such as those created in blocks 808-814, have already been used during other inference requests. If the rate limit has been reached, at block 822, the processor issues a denial of service response to the one or more inference requests. If inference requests come in at a high rate that surpass the inference rate limit, the TEE can deny service of the requests because, in some cases, this can indicate a symptom of a malfunction or indicate malicious activity. To reduce the chances of denying service for legitimate requests, the number of pre-computed obfuscated parameters can be allowed a sufficient margin so a reasonable and/or legitimate inference burst rate hike can be accommodated. If a denial of service is issued at block 822, the process 800 ends at block 832.

If, at decision block 820, the processor determines that the inference rate limit has not been reached, the process 800 moves to decision block 824. At decision block 824, the processor determines if previously computed parameters have been exhausted. If so, at block 826, the processor adjusts the number of sets of obfuscated parameters and computes new obfuscated parameters. The process 800 then moves back to decision block 820, where the processor determines if the newly created obfuscated weights exceed the rate limits, to ensure that the randomness is not exhausted. If the rate limit is reached, the processor can issue a denial of service at block 822.

If at decision block 824, parameters are not exhausted, or via block 826 new obfuscated parameters are successfully created, the process 800 moves to block 828. At block 828, the processor responds to a received inference request, in accordance with the various embodiments disclosed herein. At decision block 830, the processor determines if additional requests received at block 818 are to be processed. If so, the process 800 moves back to decision block 824. If not, the process 800 ends at block 832.

Although FIGS. 8A and 8B illustrate one example of a TEE precomputation process, various changes may be made to FIGS. 8A and 8B. For example, while shown as a series of steps, various steps in FIGS. 8A and 8B can overlap, occur in parallel, occur in a different order, or occur any number of times. As a particular example, although the process 800 is described as being performed within the TEE, block 804 could be performed outside the TEE. For instance, non-TEE processes or applications could track when the applications or AI service requests an AI inference and send an AI request to the TEE. When the requirements of decision block 806 are reached, the non-TEE processes can provide the tracked frequency data to the TEE so that the TEE can use the tracked frequency data to create obfuscated model parameters. As another particular example, in some embodiments, block 804 may not be performed, such as if the configuration data provides that a fixed number of model parameters sets are to be created at certain intervals or at certain times, such as once a week or when the device is idle.

Figure 9:
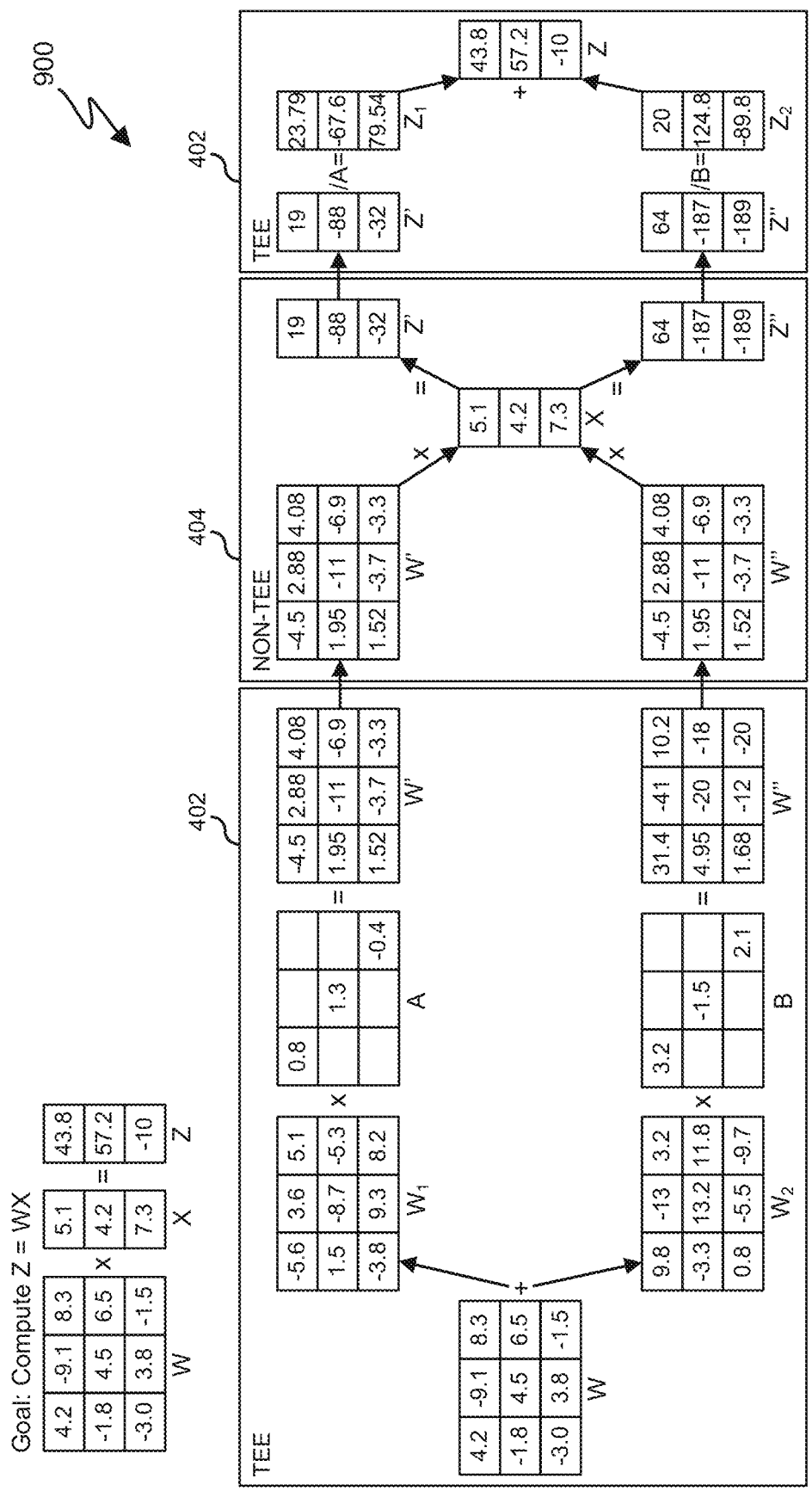
FIG. 9 illustrates an example matrix multiplication process in accordance with various embodiments of this disclosure.

FIG. 9 illustrates an example matrix multiplication process 900 in accordance with various embodiments of this disclosure. For ease of explanation, the process 900 may be described as being executed or otherwise used by the processor(s) 120 of any of the electronic devices 101, 102, 104 or the server 106 in FIG. 1. In some embodiments, the process 900 can be used by the architecture 400 described with respect to FIGS. 4A and 4B. However, the process 900 may be used by any suitable device(s) and in any suitable system.

As shown in FIG. 9, a goal of performing matrix multiplication is to compute Z=WX, where W is a weight matrix, X is an input, and Z is an output. In the example of FIG. 9, actual values are provided for purposes of clearly illustrating the example, but it will be understood that any values can be used. To prevent the non-TEE 404 from accessing actual model parameters of an AI model, the weight matrix W is obfuscated by the TEE 402 before providing the obfuscated weights to the non-TEE 404. In this example, the processor splits W by additive splitting. One example process for performing additive splitting is discussed above. The example of additive splitting in FIG. 9 creates two matrices $W_1$ and $W_2$. However, it will be understood that W can be split into any number of matrices.

To further obscure the data, the processor within the TEE perturbs $W_1$ and $W_2$ by multiplying each row in $W_1$ with a random constant ai to produce a matrix W' and by multiplying each row in $W_2$ with a random constant bi in a set B to produce a matrix W". Resulting values in any of the steps of this process may be rounded up or down. In some embodiments, random values for $W_1$, ai and bi can be generated using a pseudorandom number generator. The processor passes both matrices W' and W" to the non-TEE 404 to perform matrix multiplication, such as by the accelerator 410. The non-TEE 404 multiplies each of W' and W" by the input X such that Z'=XW' and Z"=XW". The non-TEE 404 passes Z' and Z" to the TEE 402 to perform recovery of the real output Z. The non-TEE 404 therefore does not ever see the real model parameters. While the non-TEE can see Z' and Z" and might attempt to construct the equation $$\frac{z'_i}{a_i} + \frac{z''_i}{b_i} = Z_i$$

for each row i, the non-TEE 404 is unable to determine the real results since the non-TEE 404 does not know the values for $a_i$ and $b_i$.

To recover the real output Z, the processor within the TEE 402 divides each entry in Z' by the same constants $a_i$ used previously in the obfuscation process to produce $Z_1$. Similarly, the processor divides each entry in Z" by the same constants $b_i$ used previously in the obfuscation process to produce $Z_2$. To fully recover the true result Z=WX, $Z_1$ and $Z_2$ are additively combined to provide Z, and the resulting Z can be used for a next layer of the neural network or AI model.

Although FIG. 9 illustrates one example of a matrix multiplication process, various changes may be made to FIG. 9. For example, while shown as a series of steps, various steps in FIG. 9 can overlap, occur in parallel, occur in a different order, or occur any number of times. Also, although the process 900 uses additive splitting as an example, other techniques can be used to obfuscate model parameters, such as multiplicative splitting, individual linear transformation, batch linear transformation, or sparse randomization.

A convolution deep learning network includes convolutional layers and fully connected layers that are computationally expensive. For example, matrix multiplications at these layers are computation-heavy. Matrix multiplications at the convolutional layers involve computing $WX_s$ using a filter W and any sub-matrix $X_s$. Matrix multiplications at the fully connected layers include computing WX using model parameters Wand input X Computation-heavy tasks such as these can be delegated to the non-TEE, while computations with small overhead (such as obfuscating data and performing activation functions, pooling, normalization or standardization, or other tasks) can be performed by the TEE.

Problems can arise with keeping data obscured from the non-TEE when performing multiple layers of an AI model. For example, if the output Z after being de-noised is provided to the non-TEE for subsequent processing, a malicious user or application with access to the non-TEE can construct equations Z=WX. After a sufficient number of queries, the malicious user or application can potentially solve W and gain access to the model parameters. To address this problem, for fully connected layers, the processor within the TEE can be delegated the task of executing the activation function X=f(Z) and adding noise to the next layer input X, such as by linear transformation, so that X'=cX+D. The processor sends the obfuscated input X' to the non-TEE. To compute the next layer, the processor within the non-TEE computes an obfuscated output so that Z'=W'X'. The processor within the TEE can recover the real output by Z=(Z'-W'D)/c.

For convolutional layers, the processor within the TEE can perform pooling on the output Z and send the pooling results to the non-TEE so that it is more difficult for a user or application with access to the non-TEE to determine the model parameters. Precomputing obfuscated weights as described in various embodiments of this disclosure can be performed to alleviate the efficiency impact of performing tasks such as activations and pooling in the TEE.

Figure 10:
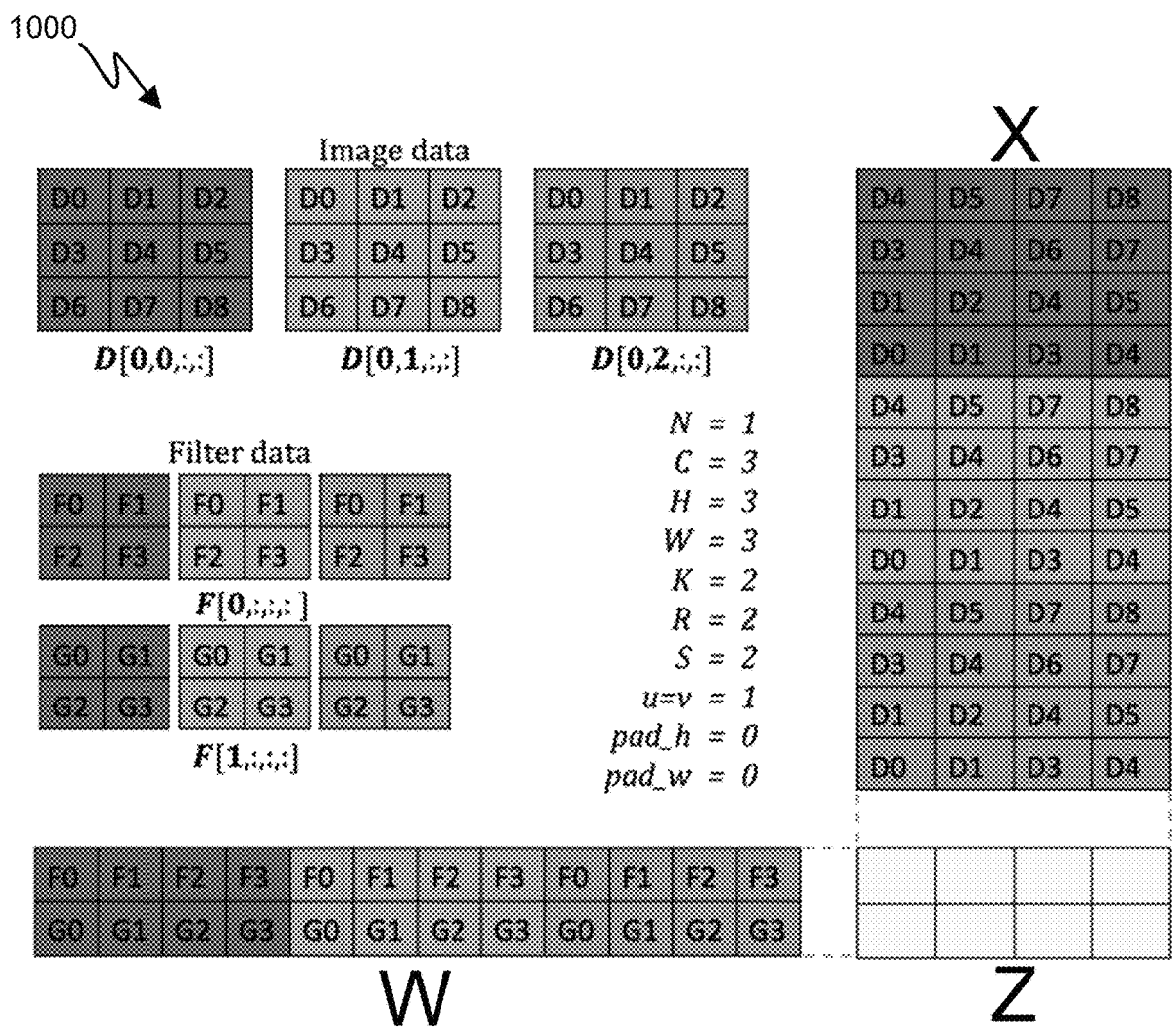
FIG. 10 illustrates an example convolution transformation diagram in accordance with various embodiments of this disclosure.

FIG. 10 illustrates an example convolution transformation diagram 1000 in accordance with various embodiments of this disclosure. Convolution can be a computationally-expensive operation. Convolution involves sliding a filter W across an input matrix X and calculating the dot product of W and each sub-matrix $X_s$ of X Thus, the convolution operation may be delegated to the non-TEE accelerator, but the filter W may not be provided to the non-TEE or the model parameters could become discoverable. The diagram 1000 illustrates transforming a convolution into a matrix multiplication of Z=WX by combining the filter data into a matrix W and combining input data into a matrix X However, since the input X and output Z are matrices, a malicious user or application with access to the non-TEE could construct equations $$\frac{z'_{ij}}{a_i} + \frac{z''_{ij}}{b_i} = Z_{ij}$$

for each row i and each column j, allowing the malicious user or application to solve for the variables $a_i$ and $b_i$ with more than two equations and thus gain access to the model parameters. To solve this issue, after performing the matrix multiplication of Z=WX by the non-TEE, the processor within the TEE can perform pooling on the output Z and send only the pooling result of Z (rather than Z itself) to the non-TEE. After transforming the convolution data into matrix multiplication, the matrix multiplication is used in the various embodiments of AI model protection of this disclosure.

Figure 11A:
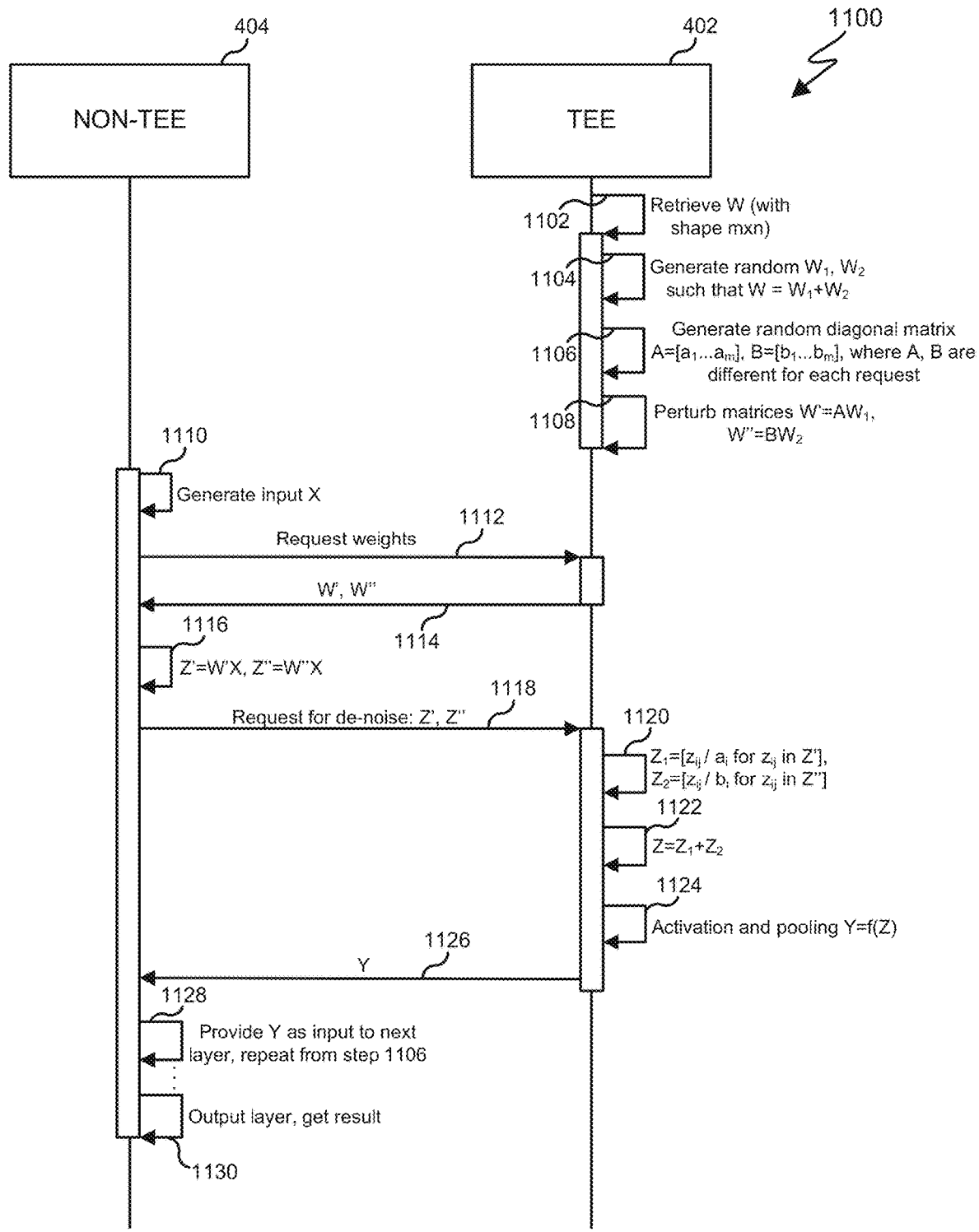
FIGS. 11A, 11B, 11C, 11D, and 11E illustrate an example multi-layer AI model protection process in accordance with various embodiments of this disclosure.
Figure 11B:
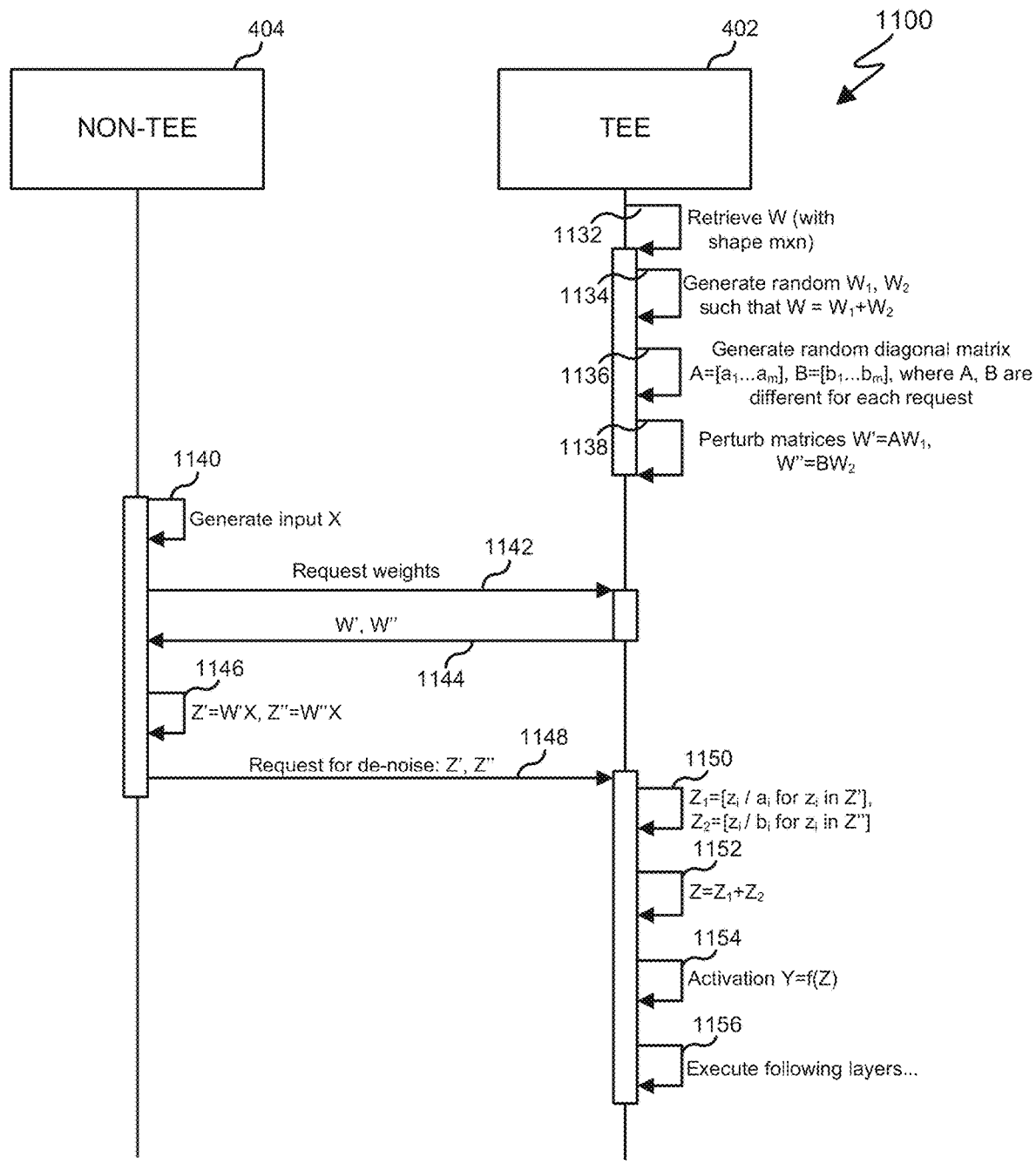
Figure 11C:
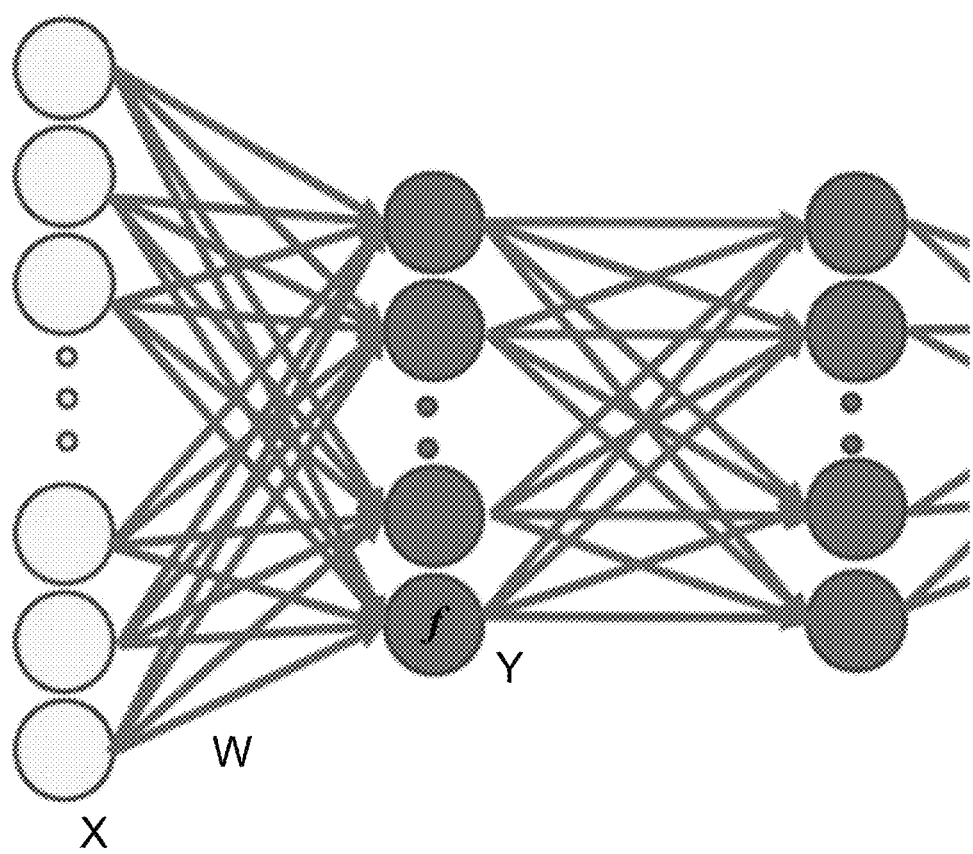
Figure 11D:
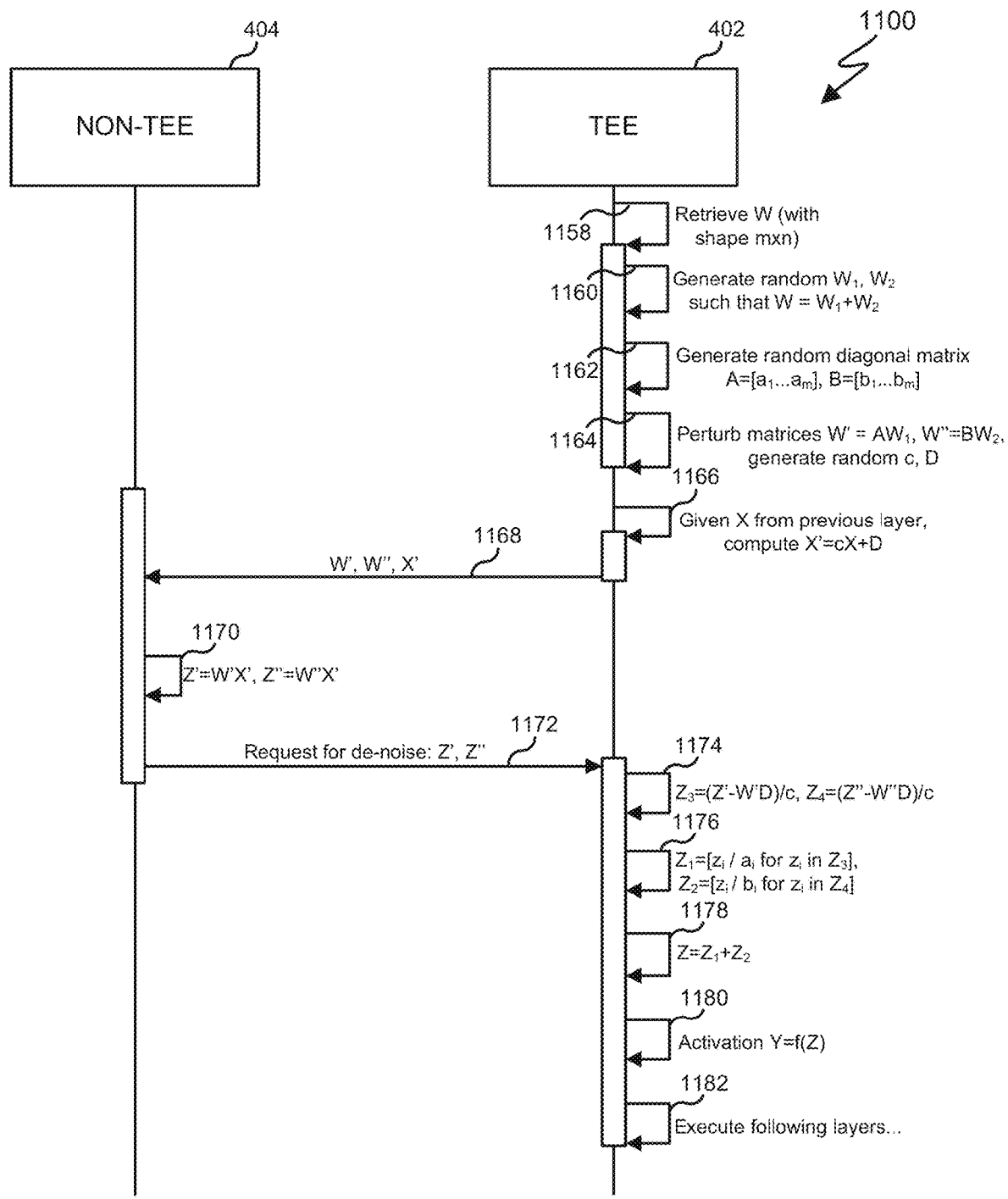
Figure 11E:
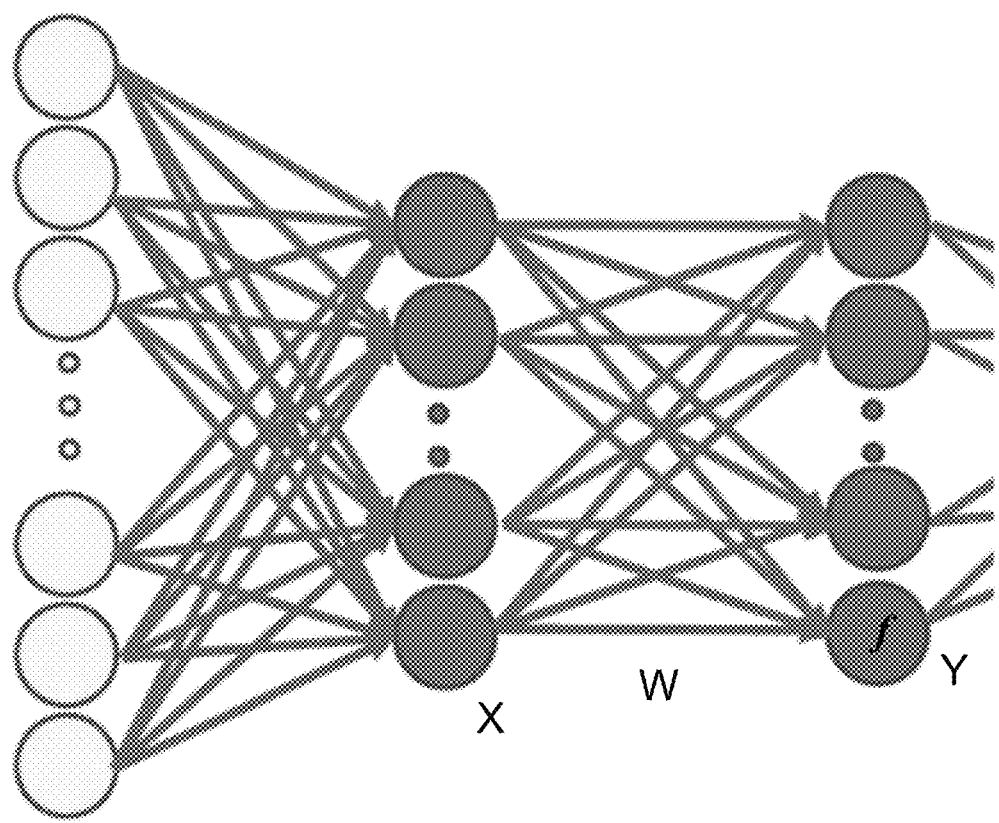

FIGS. 11A, 11B, 11C, 11D, and 11E illustrate an example multi-layer AI model protection process 1100 in accordance with various embodiments of this disclosure. More specifically, FIG. 11A illustrates a convolutional layer portion of the process 1100, FIG. 11B illustrates a first fully connected layer portion of the process 1100, FIG. 11C illustrates an example neural network representation of the first fully connected layer portion of the process 1100, FIG. 11D illustrates a subsequent fully connected layer portion of the process 1100, and FIG. 11E illustrates an example neural network representation of the subsequent fully connected layer portion of the process 1100. For ease of explanation, the process 1100 may be described as being executed or otherwise used by the processor(s) 120 of any of the electronic devices 101, 102, 104 or the server 106 in FIG. 1. In some embodiments, the process 1100 can be used by the architecture 400 described with respect to FIGS. 4A and 4B. However, the process 1100 may be used by any suitable device(s) and in any suitable system.

The process 1100 uses techniques, such as those described in FIGS. 9 and 10, to obfuscated model parameters used for the convolutional layers and the fully connected layers of an AI model. For example, in FIG. 11A, the convolutional layers are transformed to use matrix multiplications as described with respect to FIG. 10. Also, in each of FIGS. 11A, 11B, and 11D, additive splitting and perturbation of split matrices are performed as described with respect to FIG. 9.

As shown in FIG. 11A, at step 1102, the processor within the TEE 402 retrieves a weight matrix W with shape m×n. At step 1104, the processor performs additive splitting on the weight matrix W to generate two matrices $W_1$ and $W_2$ so that $W=W_1+W_2$. At step 1106, the processor generates random diagonal matrices $A=[a_1, \ldots, a_m]$ and $B=[b_1, \ldots, b_m]$. In some embodiments, A and B are newly-generated for each request. At step 1108, the processor perturbs the matrices $W_1$ and $W_2$ by computing perturbed matrices $W'=AW_1$ and $W''=BW_2$, where each $i^{th}$ row of $W_1$ is scaled with $a_i$ and each $i^{th}$ row of $W_2$ is scaled with $b_i$. In some embodiments, steps 1102-1108 can be precomputed prior to receiving an AI inference request as discussed above.

At step 1110, the processor within the non-TEE 404 generates or receives an input X At step 1112, the processor within the non-TEE 404 requests weights from the TEE 402. At step 1114, the perturbed weight matrices W' and W" are received from the TEE 402 in the non-TEE 404. At step 1116, the processor in the non-TEE 404 computes outputs Z' and Z", where Z'=W'X and Z"=W"X. At step 1118, the processor sends a request to the TEE 402 to de-noise the outputs Z' and Z". At step 1120, the processor within the TEE 402 de-noises the outputs Z' and Z" so that $Z_1=[z_{ij}/a_i$, for each $z_{ij}$ in Z'] and $Z_2=[z_{ij}/b_i$, for each $z_{ij}$ in Z"]. At step 1122, the processor additively combines $Z_1$ and $Z_2$ so that $Z=Z_1+Z_2$. At step 1124, the processor within the TEE 402 performs activation and pooling on the output Z so that $Y=f(Z)$. At step 1126, the processor within the TEE 402 provides the results of activation and pooling Y to the non-TEE 404. At step 1128, the processor within the non-TEE 404 provides Y as the input to the next layer. In some embodiments, steps 1106-1128 are repeated (possibly skipping step 1110 as the input is already provided) until all convolutional layers in the AI model are processed. At step 1130, an output layer outputs a result of the convolutional layers to one or more fully connected layers.

The convolution process performed in FIG. 11A provides for more efficient convolutional computations than performing the convolutions entirely within the TEE, such as described with respect to FIG. 2. For example, when computations are performed entirely within the TEE, multiplication operations can have a number of operations of m×l×n, and addition operations can have a number of options of m×l×(n−1). However, as shown in Table 1 below where W is an m×n matrix and X is an n×l matrix, the efficiency of the TEE is improved when computations are partitioned as in FIG. 11A. While the non-TEE performs more computations, the non-TEE can utilize the accelerator to perform computations at a faster rate, providing for an overall benefit over calculating in TEE alone.

TABLE 1

| | | Number of Operations | | |
|---|---|---|---|---|
| Operation Type | Steps 1104, 1106, 1108 | Step 1116 | Steps 1120, 1122 | Total |
| TEE | × | Precomputed | 2 × m × l | 2 × m × l |
| | + | | m × l | m × l |
| Non-TEE | × | | 2 × m × l × n | 2 × m × l × n |
| | + | | 2 × m × l × (n − 1) | 2 × m × l × (n − 1) |

As shown in FIG. 11B in which a first fully connected layer is processed as part of the process 1100, at step 1132, the processor within the TEE 402 retrieves a weight matrix W with shape m×n. At step 1134, the processor performs additive splitting on the weight matrix W to generate two matrices $W_1$ and $W_2$ so that $W=W_1+W_2$. At step 1136, the processor generates random diagonal matrices $A=[a_1, \ldots, a_m]$ and $B=[b_1, \ldots, b_m]$. In some embodiments, A and B are newly-generated for each request. At step 1138, the processor perturbs the matrices $W_1$ and $W_2$ by computing perturbed matrices $W'=AW_1$ and $W''=BW_2$, where each $i^{th}$ row of $W_1$ is scaled with $a_i$ and each $i^{th}$ row of $W_2$ is scaled with $b_i$. In some embodiments, steps 1132-1138 can be precomputed prior to receiving an AI inference request as discussed above.

At step 1140, the processor within the non-TEE 404 generates or receives an input X, which in this embodiment is the final output from the convolutional layers of the AI model. At step 1142, the processor within the non-TEE 404 requests weights from the TEE 402. At step 1144, the perturbed weight matrices W' and W'' are received from the TEE 402 by the non-TEE 404. At step 1146, the processor in the non-TEE 404 computes outputs Z' and Z'', where Z'=W'X and Z''=W''X. At step 1148, the processor sends a request to the TEE 402 to de-noise the outputs Z' and Z''. At step 1150, the processor within the TEE 402 de-noises the outputs Z' and Z'' so that $Z_1=[z_i/a_i$, for each $z_i$ in Z'] and $Z_2=[z_i/b_i$, for each $z_i$ in Z'']. At step 1152, the processor additively combines $Z_1$ and $Z_2$ so that $Z=Z_1+Z_2$. At step 1154, the processor in the TEE 402 performs an activation function on the output Z so that $Y=f(Z)$. At step 1156, the subsequent fully connected layer is executed, such as illustrated in FIG. 11D. As shown in FIG. 11C, for the first fully connected layer, the processor alters the inputs X by the weights W, and the processor applies an activation function to the results to produce the output Y for the next layer.

The process of the first fully connected layer performed in FIG. 11B provides for more efficient computations than performing the computations entirely within the TEE, such as described with respect to FIG. 2. For example, when computations are performed entirely within the TEE, multiplication operations can have a number of operations of m×n, and addition operations can have a number of options of m×(n−1). However, as shown in Table 2 below where W is an m×n matrix and X is an n-dimensional vector, the efficiency of the TEE is improved when computations are partitioned as in FIG. 11B. While the non-TEE performs more computations, the non-TEE can utilize the accelerator to perform computations at a faster rate, providing for an overall benefit over calculating in TEE alone.

TABLE 2

| | | Number of Operations | | |
|---|---|---|---|---|
| Operation Type | Steps 1134, 1136, 1138 | Step 1146 | Steps 1150, 1152 | Total |
| TEE × | Precomputed | | 2 × m | 2 × m |
| + | | | m | m |
| Non-TEE × | | 2 × m × n | | 2 × mn |
| + | | 2 × m × (n − 1) | | 2 × m × (n − 1) |

As shown in FIG. 11D in which a subsequent fully connected layer after the first fully connected layer is processed as part of the process 1100, at step 1158, the processor within the TEE 402 retrieves a weight matrix W with shape m×n. At step 1160, the processor performs additive splitting on the weight matrix W to generate two matrices $W_1$ and $W_2$ so that $W=W_1+W_2$. At step 1162, the processor generates random diagonal matrices $A=[a_1, \ldots, a_m]$ and $B=[b_1, \ldots, b_m]$. At step 1164, the processor perturbs the matrices $W_1$ and $W_2$ by computing perturbed matrices $W'=AW_1$ and $W''=BW_2$, where each $i^{th}$ row of $W_1$ is scaled with $a_i$ and each $i^{th}$ row of $W_2$ is scaled with $b_i$. Also at step 1164, the processor generates a random value c and random values in a matrix D. In some embodiments, D is a sparse vector with d non-zero values and where d<<n. In some embodiments, steps 1158-1164 can be precomputed prior to receiving an AI inference request as described above.

At step 1166, the processor within the TEE 402 (given X from the previous fully connected layer) computes a transformed X' using linear transformation so that X'=cX+D. At step 1168, the processor within the TEE 402 provides the obfuscated weights W' and W'' and the obfuscated input X' to the non-TEE 404. At step 1170, the processor in the non-TEE 404 computes outputs Z' and Z'', where Z'=WX' and Z''=W''X'. At step 1172, the processor sends a request to the TEE 402 to de-noise the outputs Z' and Z''. At step 1174, the processor de-noises outputs Z' and Z'' by reversing the linear transformation performed in step 1166 so that $Z_3=$(Z'−W'D)/c and $Z_4=$(Z''−W''D)/c. At step 1176, the processor further de-noises the outputs $Z_3$ and $Z_4$ by reversing the perturbations performing in step 1164 to produce outputs $Z_1$ and $Z_2$ so that $Z_1=[z_i/a_i$, for each $z_i$ in $Z_3$] and $Z_2=[z_i/b_i$, for each $z_i$ in $Z_4$]. At step 1178, the processor additively combines the outputs $Z_1$ and $Z_2$ so that $Z=Z_1+Z_2$. At step 1180, the processor in the TEE 402 performs an activation function on the output Z such that $Y=f(Z)$. At step 1182, any subsequent fully connected layers are executed using the same process as in FIG. 11D until a final output is reached. As shown in FIG. 11E, for fully connected layers after the first layer, the processor takes the output from the previous layer as the inputs X and alters the inputs X by the weights W. The processor then applies an activation function to the results to produce the output Y for the subsequent layer in the model, until all layers are processed.

The process of the subsequent fully connected layers performed in FIG. 11D provides for more efficient computations than performing the computations entirely within the TEE, such as described with respect to FIG. 2. For example, when computations are performed entirely within the TEE, multiplication operations can have a number of operations of m×n, and addition operations can have a number of options of m×(n−1). However, as shown in Table 3 where W is an m×n matrix, X is an n-dimensional vector, and D is a sparse vector with d non-zero values, the efficiency of the TEE is improved when computations are partitioned as in FIG. 11D. While the non-TEE performs more computations, the non-TEE can utilize the accelerator to perform computations at a faster rate, providing for an overall benefit over calculating in TEE alone.

TABLE 3

| | | Number of Operations | | | | |
|---|---|---|---|---|---|---|
| Operation Type | Steps 1160, 1162, 1164 | Step 1166 | Steps 1170 | Step 1174 | Steps 1176 and 1178 | Total |
| TEE × | Precomputed | n | | 2 × m × d | 2 × m | 2 × m × d + 2 × m + n |

TABLE 3-continued

| | | | Number of Operations | | | |
|---|---|---|---|---|---|---|
| Operation Type | Steps 1160, 1162, 1164 | Step 1166 | Steps 1170 | Step 1174 | Steps 1176 and 1178 | Total |
| Non-TEE + | | d | | 2 × m | m | 3 × m + d |
| × | | | 2 × m × n | | | 2 × m × n |
| + | | | 2 × m × (n − 1) | | | 2 × m × (n − 1) |

Although FIGS. 11A, 11B, 11C, 11D, and 11E illustrate one example of a multi-layer AI model protection process, various changes may be made to FIGS. 11A, 11B, 11C, 11D, and 11E. For example, while shown as a series of steps, various steps in FIGS. 11A, 11B, 11C, 11D, and 11E can overlap, occur in parallel, occur in a different order, or occur any number of times. Also, although the process 1100 uses additive splitting and perturbation as an example, other techniques can be used to obfuscate model parameters, such as multiplicative splitting, individual linear transformation, batch linear transformation, or sparse randomization.

Figure 12:
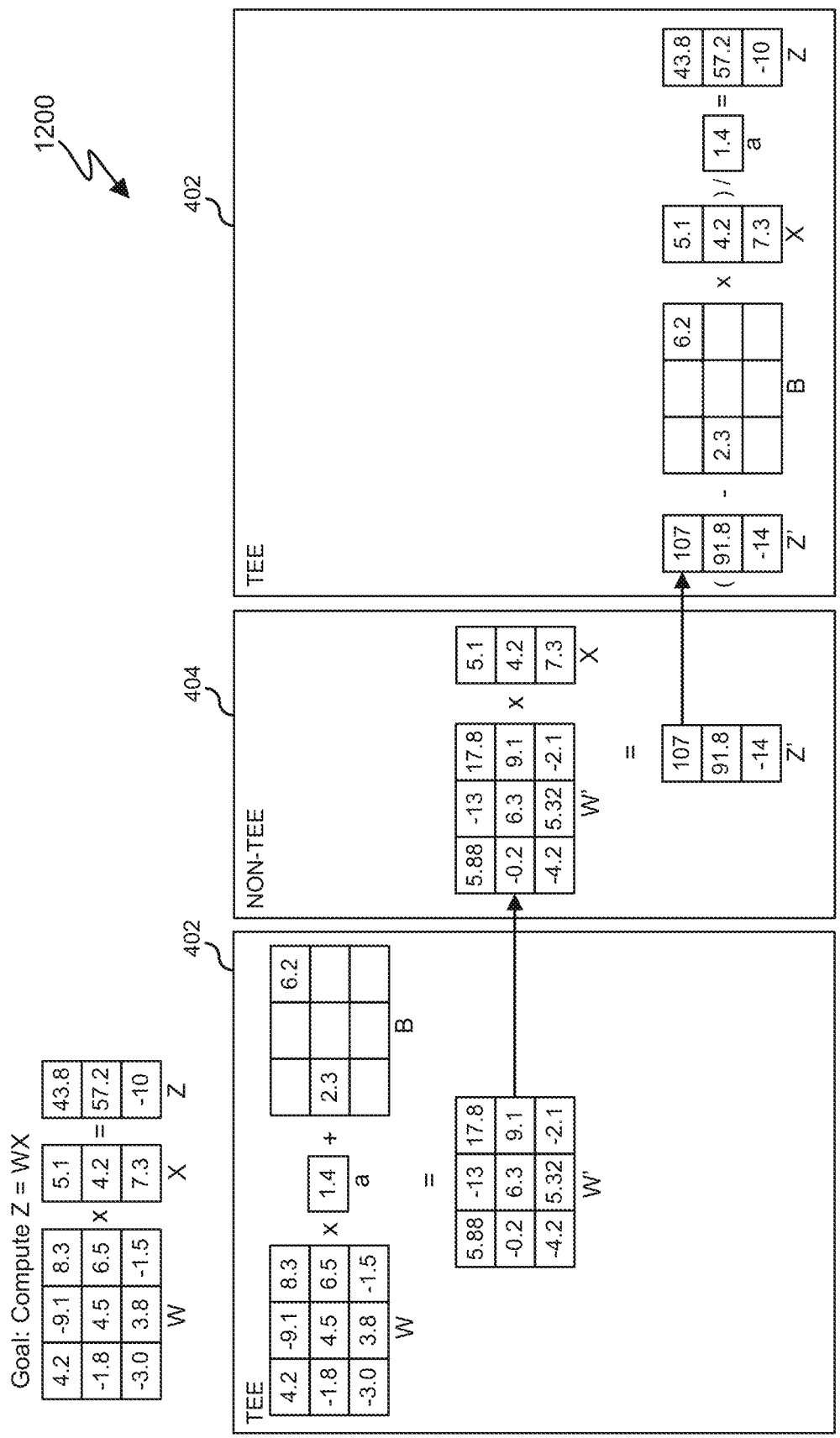
FIG. 12 illustrates an example linear transformation process in accordance with various embodiments of this disclosure.

FIG. 12 illustrates an example linear transformation process 1200 in accordance with various embodiments of this disclosure. For ease of explanation, the process 1200 may be described as being executed or otherwise used by the processor(s) 120 of any of the electronic devices 101, 102, 104 or the server 106 in FIG. 1. In some embodiments, the process 1200 can be used by the architecture 400 described with respect to FIGS. 4A and 4B. However, the process 1200 may be used by any suitable device(s) and in any suitable system.

As shown in FIG. 12, a goal of performing matrix multiplication is to compute $Z=WX$, where W is a weight matrix, X is an input, and Z is an output. Since the non-TEE 404 is to compute $Z=WX$ without knowing W, the TEE 402 can linearly transform W so that $W'=aW+B$, where B is a sparse matrix. In some embodiments, $a=1$. The example illustrated in FIG. 12 uses actual values for purposes of clearly illustrating the example, but it will be understood that any values can be used. Each value of the weight matrix W is multiplied by a, and corresponding values in B are added to produce W'. In this example, to generate a and B, the processor randomly chooses a real number for a and B within predetermined ranges. Resulting values in any of the steps of FIG. 12 may also be rounded up or down. The obfuscated weight matrix W' is provided to the non-TEE 404.

The processor in the non-TEE, such as the accelerator 410, performs matrix multiplication using W' and an input vector X so that $Z'=XW'$. The non-TEE 404 passes Z' to the TEE 402 to perform recovery of the real output Z. The non-TEE 404 therefore does not have access to the real model parameters. To recover the real output Z, the processor within the TEE 402 takes Z' received from the non-TEE 404 and calculates $Z=(Z'-BX)/a$, using a and B previously used during the obfuscation process and using the original input vector X.

Problems can arise with keeping data obscured from the non-TEE when performing multiple layers of an AI model. For example, if the output Z after being de-noised is provided to the non-TEE for subsequent processing, a malicious user or application with access to the non-TEE can construct equations $Z=WX$. After a sufficient number of queries, the malicious user or application can potentially solve W and gain access to the model parameters. To address this problem, for fully connected layers, the processor within the TEE can be delegated the task of executing the activation function $X=f(Z)$ and adding noise to the next layer input X, such as by linear transformation, so that $X'=cX+D$. The processor sends the obfuscated input X' to the non-TEE. To compute the next layer, the processor within the non-TEE computes an obfuscated output so that $Z'=W'X'$. The processor within the TEE then can recover the real output by $Z=(Z'-W'D)/c$.

Although FIG. 12 illustrates one example of a linear transformation process, various changes may be made to FIG. 12. For example, while shown as a series of steps, various steps in FIG. 12 can overlap, occur in parallel, occur in a different order, or occur any number of times. Also, although the process 1200 uses linear transformation as an example, other techniques can be used to obfuscate model parameters, such as additive or multiplicative splitting.

Figure 13A:
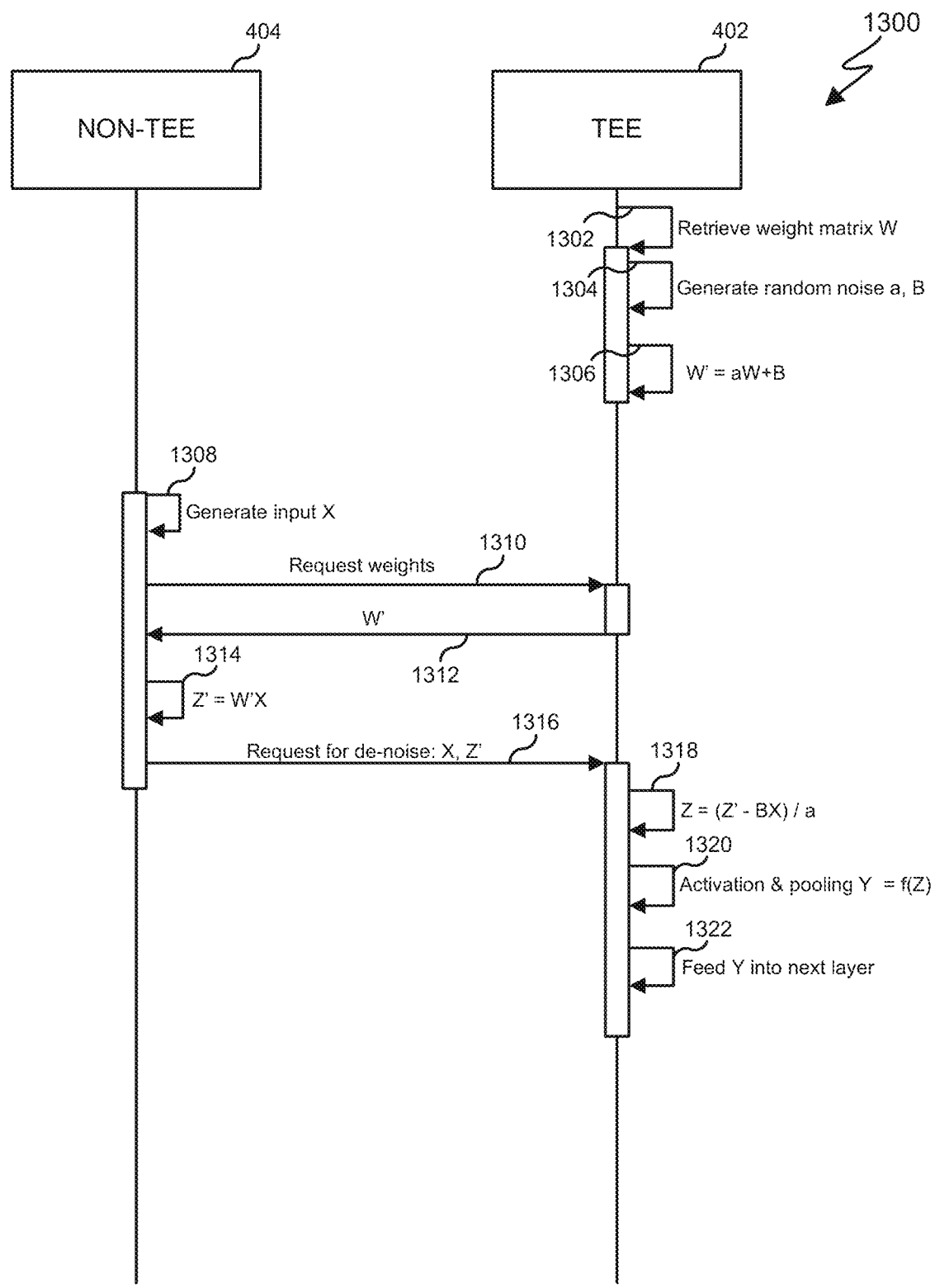
FIGS. 13A, 13B, 13C, 13D, and 13E illustrate another example multi-layer AI model protection process in accordance with various embodiments of this disclosure.
Figure 13B:
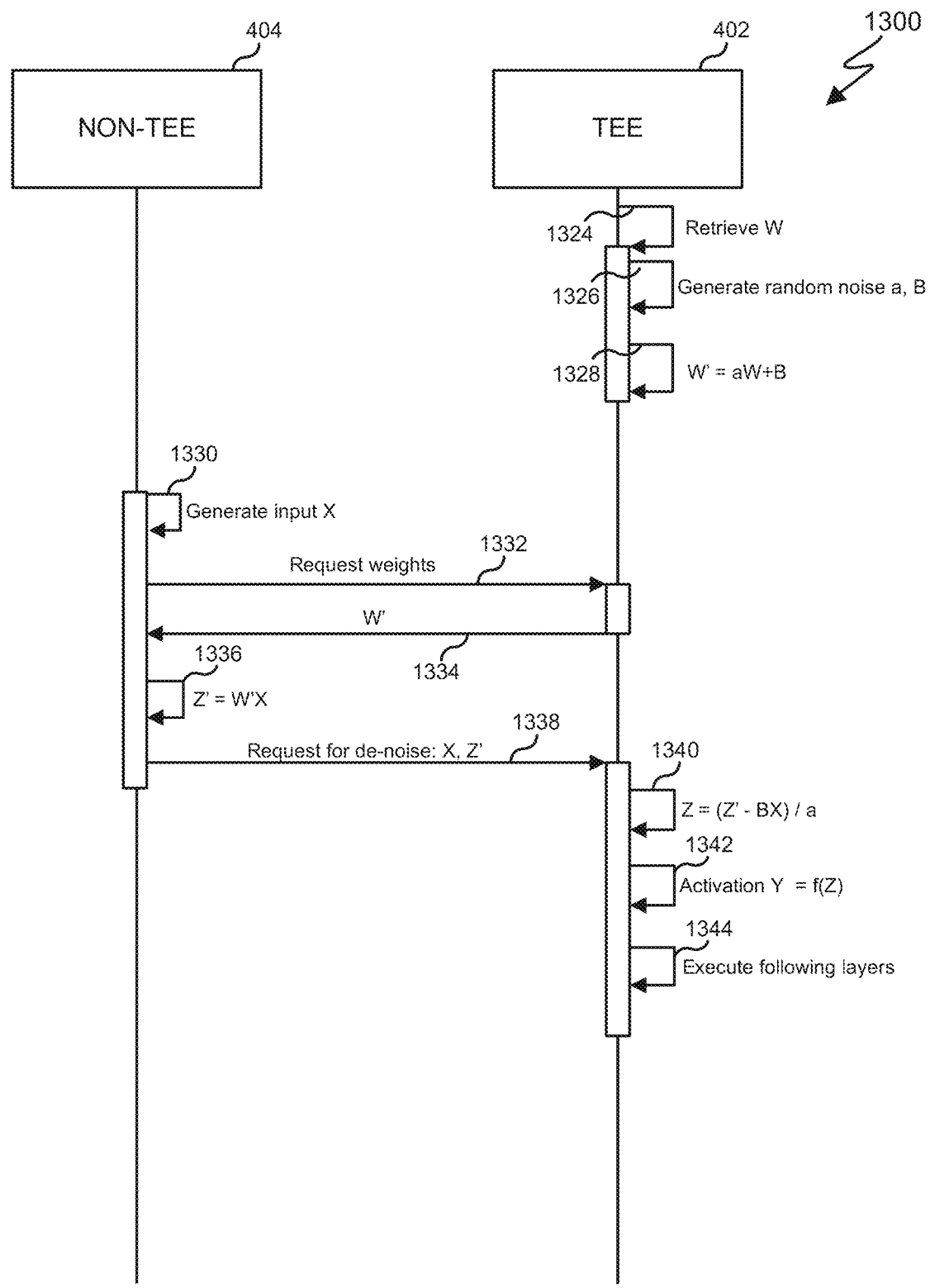
Figure 13C:
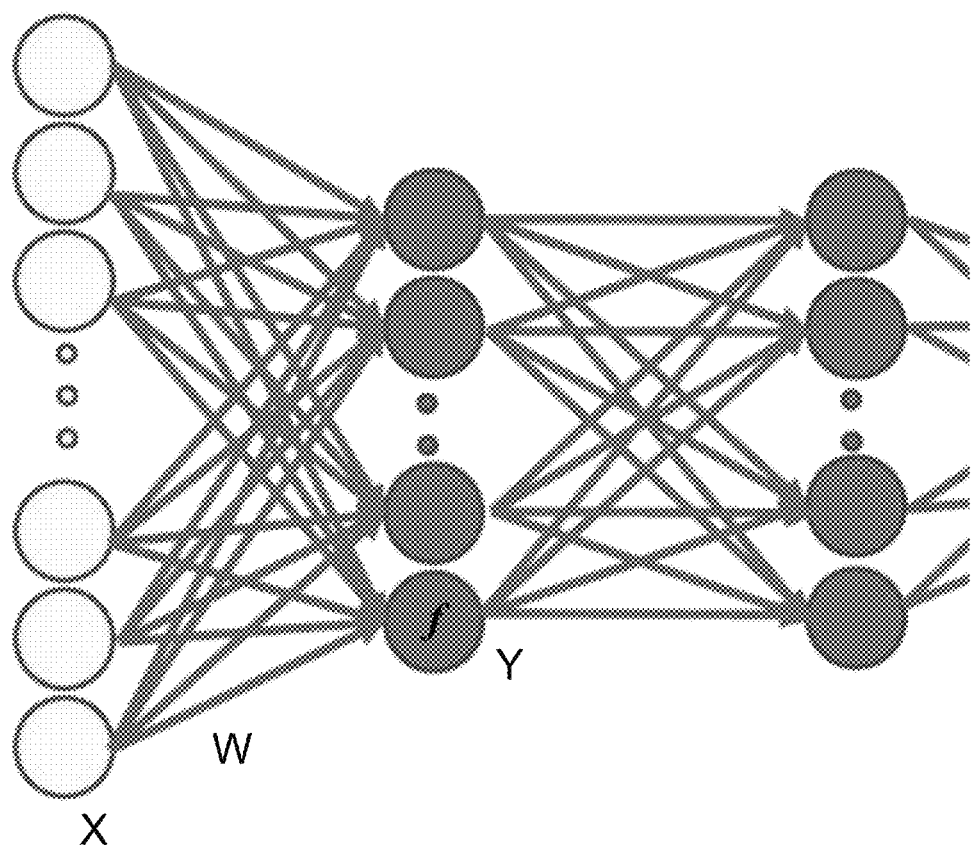
Figure 13D:
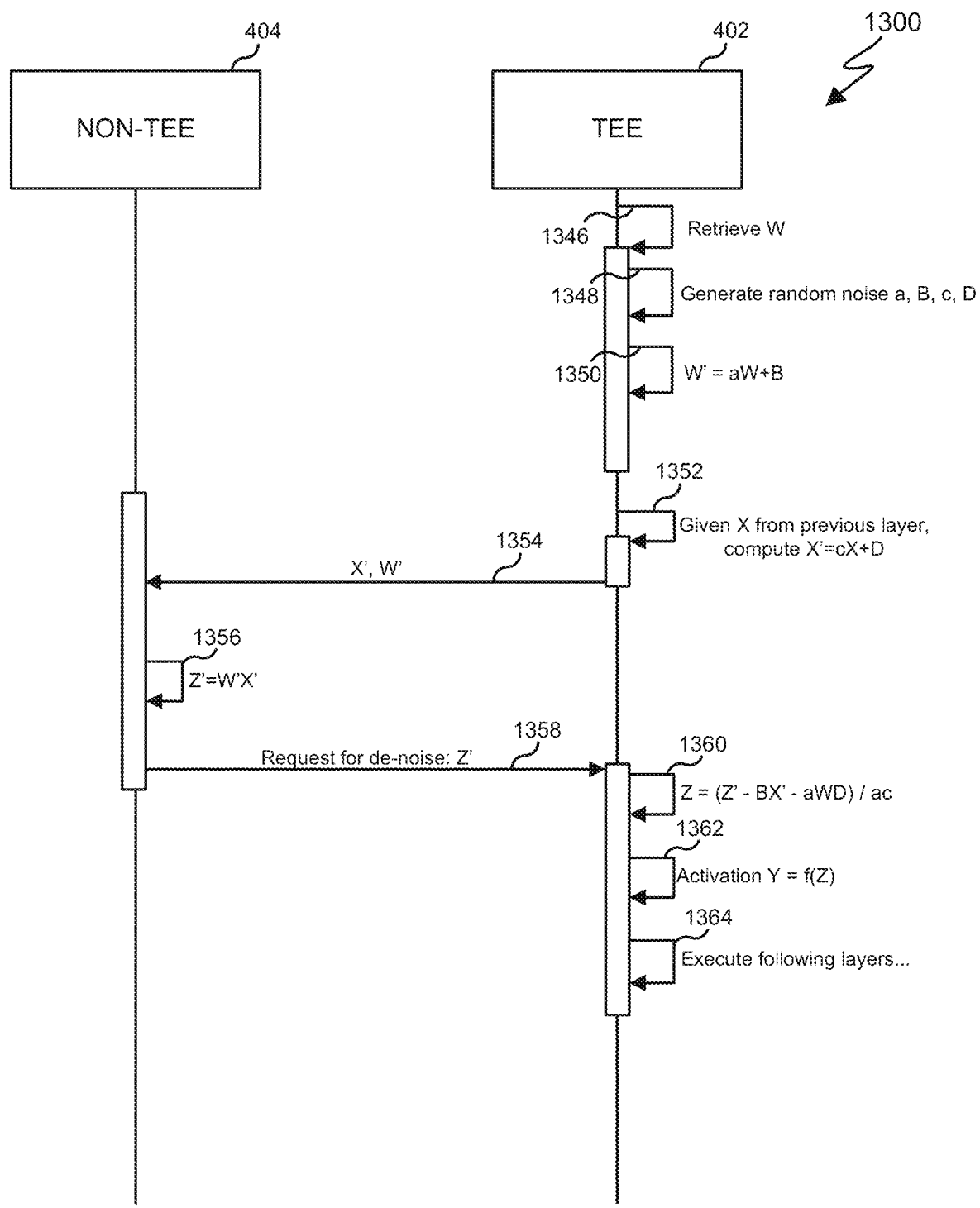
Figure 13E:
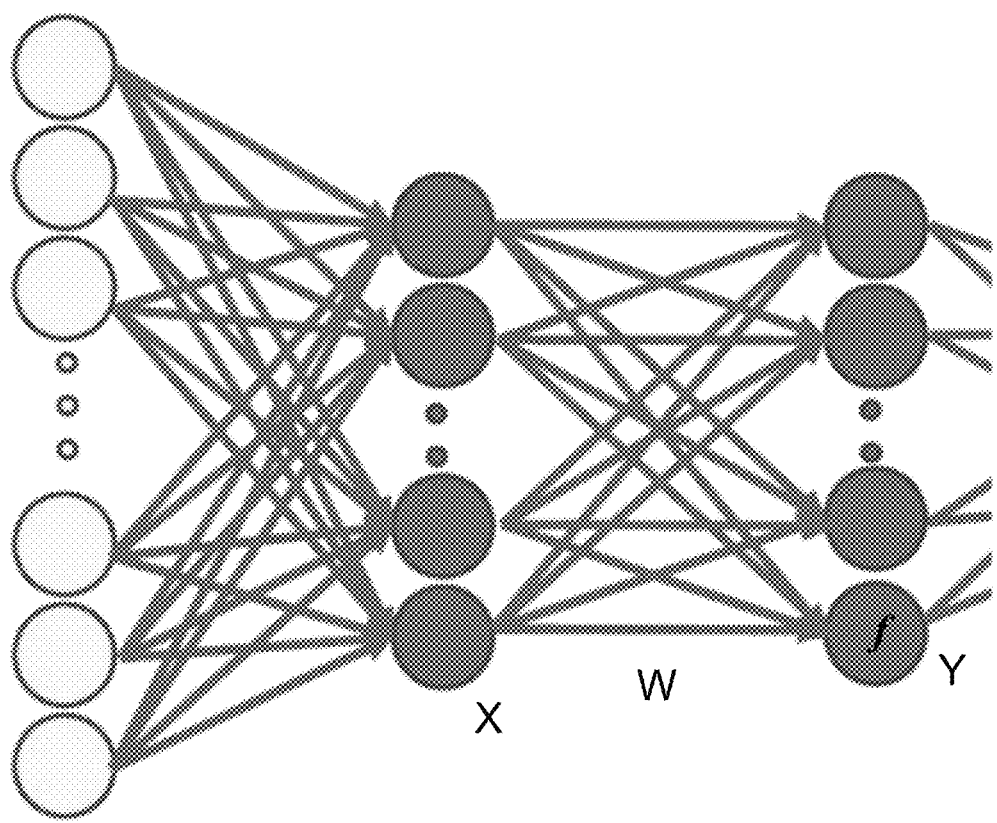

FIGS. 13A, 13B, 13C, 13D, and 13E illustrate another example multi-layer AI model protection process 1300 in accordance with various embodiments of this disclosure. More specifically, FIG. 13A illustrates a convolutional layer portion of the process 1300, FIG. 13B illustrates a first fully connected layer portion of the process 1300, FIG. 13C illustrates an example neural network representation of the first fully connected layer portion of the process 1300, FIG. 13D illustrates a subsequent fully connected layer portion of the process 1300, and FIG. 13E illustrates an example neural network representation of the subsequent fully connected layer portion of the process 1300. For ease of explanation, the process 1300 may be described as being executed or otherwise used by the processor(s) 120 of any of the electronic devices 101, 102, 104 or the server 106 in FIG. 1. In some embodiments, the process 1300 can be used by the architecture 400 described with respect to FIGS. 4A and 4B. However, the process 1300 may be used by any suitable device(s) and in any suitable system.

The process 1300 uses techniques, such as those described in FIG. 12, for obfuscating and recovering data. For example, in FIG. 13A, the convolutional layers are transformed to use matrix multiplication. Also, in each of FIGS. 13A, 13B, and 13D, linear transformation of weights and/or inputs is performed as described with respect to FIG. 12.

As shown in FIG. 13A, at step 1302, the processor within the TEE 402 retrieves a weight matrix W. At step 1304, the processor generates a random noise value a and random noise values in B, where B is a sparse matrix with b non-zero values and where $b \ll m \times n$. At step 1306, the processor transforms the weight matrix W into W' so that $W'=aW+B$. In some embodiments, steps 1302-1306 can be precomputed prior to receiving an AI inference request as described above.

At step 1308, the processor within the non-TEE 404 generates or receives an input X At step 1310, the processor within the non-TEE 404 requests weights from the TEE 402. At step 1312, the processor within the non-TEE 404 receives the obfuscated weight matrix W' from the TEE 402. As illustrated in FIG. 10, a convolution can be transformed into a matrix multiplication of Z=WX by combining filter data into a matrix W and combining input data into a matrix X To prevent a malicious user from discovering the model parameters, after performing the matrix multiplication of Z'=W'X by the non-TEE, the processor within the TEE can perform pooling on the output Z and send only the pooling result of Z (rather than Z itself) to the non-TEE for the next convolutional layer. Precomputing obfuscated weights as described in the various embodiments of this disclosure can be performed to alleviate the efficiency impact of performing tasks such as activations and pooling in the TEE.

Turning back to FIG. 13A, at step 1314, the processor in the non-TEE 404 computes outputs Z', where Z'=W'X. At step 1316, the processor sends a request to the TEE 402 to de-noise the outputs Z' and can also provide the input X At step 1318, the processor within the TEE 402 de-noises the outputs Z' so that Z=(Z'−BX)/a as described above with respect to FIG. 12. At step 1320, the processor within the TEE 402 performs activation and pooling on the output Z so that Y=$f$(Z). At step 1322, the processor within the TEE 402 provides the results of activation and pooling Y to the non-TEE 404 as the input for the next layer. In some embodiments, steps 1302-1322 are repeated (possibly skipping step 1308 as the input is already provided) until all convolutional layers in the AI model are processed.

The convolution process performed in FIG. 13A provides for more efficient convolutional computations than performing the convolutions entirely within the TEE, such as described with respect to FIG. 2. For example, when computations are performed entirely within the TEE, multiplication operations can have a number of operations of m×l×n, and addition operations can have a number of options of m×l×(n−1). However, as shown in Table 4 where W is an m×n matrix, X is an n×l matrix, and B is a sparse matrix with b non-zero values, the efficiency of the TEE is improved when computations are partitioned as in FIG. 13A.

TABLE 4

| | | Number of Operations | | |
|---|---|---|---|---|
| Operation Type | Steps 1304, 1306 | Step 1314 | Step 1318 | Total |
| TEE | × | Precomputed | | b × l + m × l |
| | | | b × l + m × l | |
| | + | | <b × l + m × l | <b × l + m × l |
| Non-TEE | × | | m × l × n | m × l × n |
| | + | | m × l × (n − 1) | m × l × (n − 1) |

As shown in FIG. 13B in which a first fully connected layer is processed as part of the process 1300, at step 1324, the processor within the TEE 402 retrieves a weight matrix W with shape m×n. At step 1326, the processor generates a random noise value a and random noise values in B, where B is a sparse matrix with b non-zero values and where b<<m×n. At step 1328, the processor transforms the weight matrix W into W' so that W'=aW+B. In some embodiments, steps 1324-1328 can be precomputed prior to receiving an AI inference request as described above.

At step 1330, the processor within the non-TEE 404 generates or receives an input X, which in this embodiment is the final output from the convolutional layers of the AI model. At step 1332, the processor within the non-TEE 404 requests weights from the TEE 402. At step 1334, the obfuscated weight matrix W' is received from the TEE 402 in the non-TEE 404. At step 1336, the processor in the non-TEE 404 computes outputs Z', where Z'=W'X. At step 1338, the processor sends a request to the TEE 402 to de-noise the outputs Z' and can also provide the input X At step 1340, the processor within the TEE 402 de-noises the outputs Z' so that Z=(Z'−BX)/a as described above with respect to FIG. 12. At step 1342, the processor within the TEE 402 applies an activation function to the output Z so that Y=$f$(Z). At step 1344, the processor within the TEE 402 provides the results of the activation Y to the non-TEE 404 as the input for the next layer. A subsequent fully connected layer can then be executed, such as illustrated in FIG. 13D. As shown in FIG. 13C, for the first fully connected layer, the processor alters the inputs X by the weights W, and the processor applies an activation function to the results to produce the output Y for the next layer.

The process of the first fully connected layer performed in FIG. 13B provides for more efficient computations than performing the computations entirely within the TEE, such as described with respect to FIG. 2. For example, when computations are performed entirely within the TEE, multiplication operations can have a number of operations of m×n, and addition operations can have a number of options of m×(n−1). However, as shown in Table 5 where W is an m×n matrix, X is an n-dimensional vector, and B is a sparse matrix with b non-zero values, the efficiency of the TEE is improved when computations are partitioned as in FIG. 13B.

TABLE 5

| | | Number of Operations | | |
|---|---|---|---|---|
| Operation Type | Steps 1326, 1328 | Step 1336 | Step 1340 | Total |
| TEE | × | Precomputed | | b + m |
| | + | | | <b + m |
| Non-TEE | × | | m × n | m × n |
| | + | | m × (n − 1) | m × (n − 1) |

As shown in FIG. 13D in which a subsequent fully connected layer after the first fully connected layer is processed as part of the process 1300, at step 1346, the processor within the TEE 402 retrieves a weight matrix W with shape m×n. At step 1348, the processor generates random noise values a and c and random noise values in B and D, where B is a sparse matrix with b non-zero values (b<<m×n) and where D is a sparse vector with d non-zero values (d<<n). At step 1350, the processor transforms the weight matrix W into W' so that W'=aW+B. In some embodiments, steps 1324-1328 can be precomputed prior to receiving an AI inference request as described above.

At step 1352, the processor within the TEE 402 (given X from the previous fully connected layer) computes a transformed X' using linear transformation so that X'=cX+D. At step 1354, the processor within the TEE 402 provides the obfuscated weights W' and W" and the obfuscated input X' to the non-TEE 404. At step 1356, the processor in the non-TEE 404 computes output Z', where Z'=W'X'. At step 1358, the processor sends a request to the TEE 402 to de-noise the output Z'. At step 1360, the processor within the TEE 402 de-noises the output Z' by reversing the linear transformation performed in step 1352 so that Z=(Z'−BX'−aWD)/ac. At step 1362, the processor in the TEE 402 performs an activation function on the output Z so that Y=$f$(Z). At step 1364, any subsequent fully connected layers are executed using the same process as in FIG. 13D until a final output is reached. As shown in FIG. 13E, for fully connected layers after the first layer, the processor takes the output from the previous layer as the inputs X and alters the inputs X by the weights W. The processor then applies an activation function to the results to produce the output Y for the subsequent layer in the model, until all layers are processed.

The process of the subsequent fully connected layers performed in FIG. 13D provides for more efficient computations than performing the computations entirely within the TEE, such as described with respect to FIG. 2. For example, when computations are performed entirely within the TEE, multiplication operations can have a number of operations of m×n, and addition operations can have a number of options of m×(n−1). However, as shown in Table 6 where W is an m×n matrix, X is an n-dimensional vector, B is a sparse matrix with b non-zero values, and D is a sparse vector with d non-zero values, the efficiency of the TEE is improved when computations are partitioned as in FIG. 13D.

TABLE 6

| Operation Type | | Steps 1348, 1350 | Step 1352 | Step 1356 | Step 1360 | Total |
| --- | --- | --- | --- | --- | --- | --- |
| TEE | × | Precomputed | n | | b + m × d + 2 × m + 1 | m × d + 2 × m + n + b + 1 |
| | + | | d | | <b + m × d + 1 | <md + b + d + 1 |
| Non-TEE | × | | | m × n | | mn |
| | + | | | m × (n − 1) | | m × (n − 1) |

Although FIGS. 13A, 13B, and 13D illustrate one example of a multi-layer AI model protection process, various changes may be made to FIGS. 13A, 13B, and 13D. For example, while shown as a series of steps, various steps in FIGS. 13A, 13B, and 13D can overlap, occur in parallel, occur in a different order, or occur any number of times. Also, although the process 1300 uses linear transformation as an example, other techniques can be used to obfuscate model parameters, such as additive or multiplicative splitting.

Although this disclosure has been described with example embodiments, various changes and modifications may be suggested to one skilled in the art. It is intended that this disclosure encompass such changes and modifications as fall within the scope of the appended claims.

What is claimed is:

1. An electronic device comprising:
at least one transceiver;
at least one memory; and
at least one processor coupled to the at least one transceiver and the at least one memory, the at least one processor configured to:
receive, via the at least one transceiver, an artificial intelligence (AI) model in a trusted execution environment (TEE) operated by the at least one processor;
receive in the TEE an inference request and input data from a source outside the TEE;
partition a calculation of an inference result between an internal calculation performed by processor resources within the TEE and an external calculation performed by processor resources outside the TEE, wherein, to partition the calculation of the inference result, the at least one processor is configured to:
split, as at least part of the internal calculation, a weight matrix of the AI model into at least two matrices in order to obfuscate data provided for the external calculation; and
provide the at least two matrices to the processor resources outside the TEE;
determine, as at least part of the external calculation, a plurality of outputs using the at least two matrices and the input data and provide the plurality of outputs to the processor resources within the TEE; and
produce the inference result based on the plurality of outputs.

2. The electronic device of claim 1, wherein, to partition the calculation of the inference result, the at least one processor is further configured to:
determine a computation workload for the calculation of the inference result; and
assign a computation-heavy portion of the computation workload to the external calculation performed by the processor resources outside the TEE.

3. The electronic device of claim 2, wherein the computation-heavy portion of the computation workload includes convolution.

4. The electronic device of claim 1, wherein, to split the weight matrix of the AI model into the at least two matrices, the at least one processor is configured to:
randomly select, for each parameter of a first matrix of the at least two matrices, a real number within a specified range; and
determine each parameter of a second matrix of the at least two matrices based on differences between parameters of the weight matrix and parameters of the first matrix.

5. The electronic device of claim 4, wherein the at least one processor is configured to randomly perturb one or more parameters of each of the at least two matrices.

6. The electronic device of claim 5, wherein, to randomly perturb the one or more parameters of each of the at least two matrices, the at least one processor is configured to:
multiply at least one parameter of the first matrix with a first random constant; and
multiply at least one parameter of the second matrix with a second random constant different than the first random constant.

7. The electronic device of claim 1, wherein the at least one processor is further configured to perform, using the processor resources within the TEE, at least a portion of the internal calculation prior to receiving the inference request.

8. A method for artificial intelligence (AI) model protection on an electronic device including at least one transceiver, at least one memory, and at least one processor, the method comprising:
receiving, via the at least one transceiver, an AI model in a trusted execution environment (TEE) operated by the at least one processor;
receiving in the TEE an inference request and input data from a source outside the TEE;
partitioning, by the at least one processor, a calculation of an inference result between an internal calculation performed by processor resources within the TEE and an external calculation performed by processor resources outside the TEE, wherein partitioning the calculation of the inference result comprises:
splitting, as at least part of the internal calculation, a weight matrix of the AI model into at least two matrices in order to obfuscate data provided for the external calculation; and
providing the at least two matrices to the processor resources outside the TEE;
determining, as at least part of the external calculation, a plurality of outputs using the at least two matrices and the input data and providing the plurality of outputs to the processor resources within the TEE; and
producing, by the at least one processor, the inference result based on the plurality of outputs.

9. The method of claim 8, wherein partitioning the calculation of the inference result further includes:
determining a computation workload for the calculation of the inference result; and
assigning a computation-heavy portion of the computation workload to the external calculation performed by the processor resources outside the TEE.

10. The method of claim 9, wherein the computation-heavy portion of the computation workload includes convolution.

11. The method of claim 8, wherein splitting the weight matrix of the AI model into the at least two matrices comprises:
randomly selecting, for each parameter of a first matrix of the at least two matrices, a real number within a specified range; and
determining each parameter of a second matrix of the at least two matrices based on differences between parameters of the weight matrix and parameters of the first matrix.

12. The method of claim 11, further comprising:
randomly perturbing one or more parameters of each of the at least two matrices.

13. The method of claim 12, wherein randomly perturbing the one or more parameters of each of the at least two matrices comprises:
multiplying at least one parameter of the first matrix with a first random constant; and
multiplying at least one parameter of the second matrix with a second random constant different than the first random constant.

14. The method of claim 8, further comprising:
performing, using the processor resources within the TEE, at least a portion of the internal calculation prior to receiving the inference request.

15. A non-transitory computer readable medium embodying a computer program, the computer program comprising instructions that when executed cause at least one processor of an electronic device to:
receive, via at least one transceiver of the electronic device, an artificial intelligence (AI) model in a trusted execution environment (TEE) operated by the at least one processor;
receive in the TEE an inference request and input data from a source outside the TEE;
partition a calculation of an inference result between an internal calculation performed by processor resources within the TEE and an external calculation performed by processor resources outside the TEE, wherein the instructions that when executed cause the at least one processor to partition the calculation of the inference result comprise instructions that when executed cause the at least one processor to:
split, as at least part of the internal calculation, a weight matrix of the AI model into at least two matrices in order to obfuscate data provided for the external calculation; and
provide the at least two matrices to the processor resources outside the TEE;
determine, as at least part of the external calculation, a plurality of outputs using the at least two matrices and the input data and provide the plurality of outputs to the processor resources within the TEE; and
produce the inference result based on the plurality of outputs.

16. The non-transitory computer readable medium of claim 15, wherein the instructions that when executed cause the at least one processor to partition the calculation of the inference result further comprise instructions that when executed cause the at least one processor to:
determine a computation workload for the calculation of the inference result; and
assign a computation-heavy portion of the computation workload to the external calculation performed by the processor resources outside the TEE.

17. The non-transitory computer readable medium of claim 15, wherein the instructions that when executed cause the at least one processor to split the weight matrix of the AI model into the at least two matrices comprise instructions that when executed cause the at least one processor to:
randomly select, for each parameter of a first matrix of the at least two matrices, a real number within a specified range; and
determine each parameter of a second matrix of the at least two matrices based on differences between parameters of the weight matrix and parameters of the first matrix.

18. The non-transitory computer readable medium of claim 17, wherein the computer program further comprises instructions that when executed cause the at least one processor to randomly perturb one or more parameters of each of the at least two matrices.

19. The non-transitory computer readable medium of claim 18, wherein the instructions that when executed cause the at least one processor to randomly perturb the one or more parameters of each of the at least two matrices comprise instructions that when executed cause the at least one processor to:
multiply at least one parameter of the first matrix with a first random constant; and multiply at least one parameter of the second matrix with a second random constant different than the first random constant.

20. The non-transitory computer readable medium of claim 15, wherein the instructions when executed further cause the at least one processor to perform, using the processor resources within the TEE, at least a portion of the internal calculation prior to receiving the inference request.

* * * * *